United States Patent
Tamura et al.

(10) Patent No.: US 12,103,478 B2
(45) Date of Patent: Oct. 1, 2024

(54) VEHICLE SYSTEM AND INFORMATION PROCESSING METHOD

(71) Applicant: Panasonic Intellectual Property Management Co., Ltd., Osaka (JP)

(72) Inventors: Kento Tamura, Kanagawa (JP); Jun Anzai, Kanagawa (JP); Yoshiharu Imamoto, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 566 days.

(21) Appl. No.: 17/239,187

(22) Filed: Apr. 23, 2021

(65) Prior Publication Data

US 2021/0237665 A1 Aug. 5, 2021

Related U.S. Application Data

(63) Continuation of application No. PCT/JP2019/022977, filed on Jun. 10, 2019.

(30) Foreign Application Priority Data

Oct. 29, 2018 (JP) ................................. 2018-202629

(51) Int. Cl.
*B60R 16/023* (2006.01)
*G06F 21/55* (2013.01)
*G07C 5/08* (2006.01)

(52) U.S. Cl.
CPC .......... *B60R 16/023* (2013.01); *G06F 21/554* (2013.01); *G07C 5/085* (2013.01); *G06F 2221/034* (2013.01)

(58) Field of Classification Search
CPC . H04L 63/1441; H04L 63/18; H04L 63/1425; B60R 16/023; H04W 4/40;
(Continued)

(56) References Cited

U.S. PATENT DOCUMENTS

| 7,971,244 B1* | 6/2011 | Kajekar | H04L 63/101 |
|---|---|---|---|
| | | | 709/224 |
| 2013/0030641 A1* | 1/2013 | Olsen, III | G07C 5/0808 |
| | | | 701/31.6 |

(Continued)

FOREIGN PATENT DOCUMENTS

| EP | 3148236 | 3/2017 |
|---|---|---|
| JP | 2003-085139 | 3/2003 |

(Continued)

OTHER PUBLICATIONS

Official Communication issued in International Patent Application No. PCT/JP2019/022977, dated Jul. 23, 2019, along with an English translation thereof.

(Continued)

*Primary Examiner* — Stephen Holwerda
(74) *Attorney, Agent, or Firm* — Greenblum and Bernstein, P.L.C.

(57) ABSTRACT

A vehicle system is a vehicle system used for a vehicle, and includes: a plurality of in-vehicle apparatuses installed in the vehicle; and at least one of (i) a controller that, in accordance with a depth of penetration of a malicious attack carried out on the plurality of in-vehicle apparatuses, changes at least one of a communication method with an outside of the vehicle, a defense method against the malicious attack, or a storage method for logs pertaining to the plurality of in-vehicle apparatuses, or (ii) a determiner that determines whether or not the malicious attack is being carried out based on anomaly detection in the plurality of in-vehicle apparatuses.

16 Claims, 29 Drawing Sheets

(58) Field of Classification Search
CPC .. H04W 12/122; G06F 21/554; G06F 21/552; G06F 2221/034; G07C 5/085
See application file for complete search history.

(56) References Cited

U.S. PATENT DOCUMENTS

| | | |
|---|---|---|
| 2013/0203400 A1 | 8/2013 | Ricci |
| 2013/0227648 A1* | 8/2013 | Ricci ............... H04W 12/088 726/3 |
| 2014/0247122 A1* | 9/2014 | Moeller ............ G06F 21/554 340/426.25 |
| 2015/0113638 A1* | 4/2015 | Valasek ............ G06F 21/562 726/22 |
| 2015/0191135 A1 | 7/2015 | Noon et al. |
| 2015/0191136 A1 | 7/2015 | Noon et al. |
| 2015/0191151 A1 | 7/2015 | Noon et al. |
| 2015/0195297 A1 | 7/2015 | Noon et al. |
| 2015/0271201 A1 | 9/2015 | Ruvio et al. |
| 2016/0359893 A1* | 12/2016 | Kishikawa ............ H04L 67/12 |
| 2016/0373449 A1* | 12/2016 | Haga .................. H04W 12/12 |
| 2017/0026386 A1* | 1/2017 | Unagami .......... H04L 12/40032 |
| 2017/0093866 A1 | 3/2017 | Ben-Noon et al. |
| 2017/0149820 A1* | 5/2017 | Ruvio ................ G06N 20/00 |
| 2018/0295147 A1 | 10/2018 | Haga et al. |
| 2018/0316699 A1* | 11/2018 | David ............... H04L 63/1425 |
| 2019/0258251 A1* | 8/2019 | Ditty ................. G05D 1/0274 |
| 2019/0334897 A1* | 10/2019 | Anzai ............... B60R 16/023 |

FOREIGN PATENT DOCUMENTS

| | | |
|---|---|---|
| JP | 2008-146157 | 6/2008 |
| JP | 2015-136107 | 7/2015 |
| JP | 2016-129314 | 7/2016 |
| JP | 2016-151871 | 8/2016 |
| JP | 2017-111796 | 6/2017 |
| WO | 2014/061021 | 4/2014 |
| WO | 2018/070155 | 4/2018 |
| WO | 2018/135098 | 7/2018 |

OTHER PUBLICATIONS

Office Action from Japan Patent Office (JPO) in Japanese Patent Appl. No. 2018-202629, dated Oct. 12, 2021, together with an English language translation.
Extended European Search Report (EESR) from European Patent Office (EPO) in European Patent Application No. 19877807.8, dated Nov. 5, 2021.
Office Action and Search Report issued by the China National Intellectual Property Administration (CNIPA) in Chinese Patent Application No. 201980069725.7, dated Mar. 25, 2024, together with English language translations.

* cited by examiner

FIG. 7

Control with monitoring ECU or monitoring block

| Depth / Control | TCU | IVI | GW | ADAS ECU | Control-related ECU |
|---|---|---|---|---|---|
| Notification | - If attack failed, notify server using TCU<br>- If attack successful, notify server using IVI | - If TCU usable, notify server using TCU<br>- If TCU unusable, notify server using V2X or e-call<br>- If all unusable, notify user | - Notify using same communication path as on left | | |
| Defense | - Stop TCU and switch communication system to other | - Stop IVI and switch communication system to other | - If attack successful in one communication channel, switch to safe mode<br>- If attack successful in all communication channels, stop autonomous driving or transition to failsafe<br>- Notify control-related ECU, etc.<br>- Output error frame | - Output error frame | |
| Storage | - Save logs of TCU and in-vehicle network connected to TCU | - Further save logs of IVI and in-vehicle network connected to IVI | - Further save GW log for each communication channel | - Further save ECU log for each ECU<br>- Further save log of in-vehicle network connected to ECU for each bus | |

FIG. 8

Control with GW

| Control \ Depth | TCU | IVI | GW | ADAS ECU | Control-related ECU |
|---|---|---|---|---|---|
| Notification | - If attack failed, notify server using TCU<br>- If attack successful, notify server using IVI | - If TCU usable, notify server using TCU<br>- If TCU unusable, notify server using V2X or e-call<br>- If all unusable, notify user | - If attack successful on only one of two GW communication channels, notify using same communication paths on left | | |
| Defense | - Stop TCU and switch communication system to other | - Stop IVI and switch communication system to other | - If attack command detected, prohibit transfer<br>- If attack successful in one communication channel, switch to safe mode<br>- Stop autonomous driving or transition to failsafe before attack on all communication channels | | |
| Storage | - Save logs of TCU and in-vehicle network connected to TCU<br>- Store minimum number of logs in GW, rest in IVI | - Further save logs of IVI and in-vehicle network connected to IVI | - Further save GW log for each communication channel | - Further save ECU log for each ECU<br>- Further save log of in-vehicle network connected to ECU for each bus | |

FIG. 9

Control with ADAS ECU

| Depth / Control | TCU | IVI | GW | ADAS ECU | Control-related ECU |
|---|---|---|---|---|---|
| Notification | - If attack failed, notify server using TCU<br>- If attack successful, notify server using IVI | - If TCU usable, notify server using TCU<br>- If TCU unusable, notify server using V2X or e-call<br>- If all unusable, notify user | - Notify using same communication path as on left | | |
| Defense | - Stop TCU and switch communication system to other | - Stop IVI and switch communication system to other | - If attack successful in one communication channel, switch to safe mode<br>- If attack successful in all communication channels, stop autonomous driving or transition to failsafe<br>- Notify control-related ECU, etc.<br>- Output error frame | | |
| Storage | - Save logs of TCU and in-vehicle network connected to TCU | - Further save logs of IVI and in-vehicle network connected to IVI | - Further save GW log for each communication channel | | |

FIG. 10

Control with V2X ECU

| Control \ Depth | TCU | IVI | GW | ADAS ECU | Control-related ECU |
|---|---|---|---|---|---|
| Notification | - If attack failed, notify server using TCU<br>- If attack successful, notify server using IVI | - If TCU usable, notify server using TCU<br>- If TCU unusable, notify server using V2X or e-call<br>- If all unusable, notify user | - Notify using same communication path as on left | | |
| Defense | - Stop TCU and switch communication system to other | - Stop IVI and switch communication system to other | - If attack successful in one communication channel, switch to safe mode<br>- If attack successful in all communication channels, stop autonomous driving or transition to failsafe<br>- Notify control-related ECU, etc.<br>- Output error frame | - Output error frame | |
| Storage | - Save logs of TCU and in-vehicle network connected to TCU | - Further save logs of IVI and in-vehicle network connected to IVI | - Further save GW for each communication channel | - Further save ECU log for each ECU<br>- Further save log of in-vehicle network connected to ECU for each bus | |

FIG. 11

| Control\Depth | Control with IVI | | Attack outside IVI | | |
|---|---|---|---|---|---|
| | TCU | IVI | GW | ADAS ECU | Control-related ECU |
| Notification | - If attack failed, notify server using TCU<br>- If attack successful, notify server using IVI | / | - If TCU usable, notify server using TCU<br>- If TCU unusable, notify server using IVI | / | / |
| Defense | - Stop TCU and switch communication system to other | / | - If attack successful in one communication channel, switch to safe mode<br>- Notify control-related ECU, etc. | / | / |
| Storage | - Save logs of TCU and in-vehicle network connected to TCU | / | - Further save GW for each communication channel | / | - Further save ECU log for each ECU<br>- Further save log of in-vehicle network connected to ECU for each bus |

FIG. 13

Control with monitoring ECU or monitoring block

| Depth / Control | V2X ECU | ADAS ECU | GW | Control-related ECU |
|---|---|---|---|---|
| Notification | - Notify server using TCU, IVI, or e-call<br>- If all unusable, notify user | | | |
| Defense | - Stop V2X and switch communication system to other<br>- Notify control-related ECU, etc.<br>- Output error frame | - Output error frame | - If attack successful in one communication channel, switch to safe mode<br>- If attack successful in all communication channels, stop autonomous driving or transition to failsafe<br>- Output error frame | - Output error frame |
| Storage | - Save logs of V2X and in-vehicle network connected to V2X | - Further save logs of ADAS ECU | - Further save GW log for each communication channel | - Further save ECU log for each ECU<br>- Further save log of in-vehicle network connected to ECU for each bus |

FIG. 14

Control with GW

| Control \ Depth | V2X ECU | ADAS ECU | GW | Control-related ECU |
|---|---|---|---|---|
| Notification | - Notify server using TCU, IVI, or e-call<br>- If all unusable, notify user | | - If attack successful on only one of GW communication channels, notify as on left via other GW communication channel | |
| Defense | - Stop V2X and switch communication system to other<br>- Notify control system ECU, etc.<br>- Output error frame | - Output error frame | - If attack command detected, prohibit transfer<br>- If attack successful in one communication channel, switch to safe mode<br>- Stop autonomous driving or transition to failsafe before attack on all communication channels | |
| Storage | - Save logs of V2X and in-vehicle network connected to V2X | - Further save logs of ADAS ECU | - Further save GW log for each communication channel | - Further save ECU log for each ECU<br>- Further save log of in-vehicle network connected to ECU for each bus |

FIG. 17

Control with ADAS ECU

| Depth / Control | V2X ECU | GW | ADAS ECU | Control-related ECU |
|---|---|---|---|---|
| Notification | - Notify server using TCU, IVI, or e-call<br>- If all unusable, notify user | - If attack successful on only one of GW communication channels, notify as on left via other GW communication channel | | |
| Defense | - Stop V2X and switch communication system to other<br>- Notify control-related ECU, etc. | - If attack successful in one communication channel, switch to safe mode<br>- If attack successful in all communication channels, stop autonomous driving or transition to failsafe<br>- Output error frame | | |
| Storage | - Save logs of V2X and in-vehicle network connected to V2X | - Further save GW log for each communication channel | | |

FIG. 25

| Detection time | Anomaly location |
|---|---|
| 2018/08/01 15:10:23 | IVI |
| 2018/08/03 12:38:48 | Control-related ECU |
| 2018/08/08 17:15:12 | ADAS ECU |
| 2018/08/10 11:43:05 | IVI |
| 2018/08/10 11:43:08 | GW |

FIG. 26

| Detection time | Anomaly location |
|---|---|
| 2018/08/01 15:10:23 | IVI |
| 2018/08/03 12:38:48 | Control-related ECU |
| 2018/08/08 17:15:12 | ADAS ECU |
| 2018/08/10 11:43:05 | IVI |
| 2018/08/10 11:43:08 | GW |
| 2018/08/10 11:43:11 | ADAS ECU |

New anomaly detection result

Plurality of anomaly detection results to be extracted

VEHICLE SYSTEM AND INFORMATION PROCESSING METHOD

CROSS REFERENCE TO RELATED APPLICATIONS

This is a continuation application of PCT International Application No. PCT/JP2019/022977 filed on Jun. 10, 2019, designating the United States of America, which is based on and claims priority of Japanese Patent Application No. 2018-202629 filed on Oct. 29, 2018.

FIELD

The present disclosure relates to a vehicle system and the like.

BACKGROUND

PTL 1 proposes a system for providing security in an in-vehicle communication network. In addition, PTL 2 proposes an in-vehicle system that detects devices improperly connected to an in-vehicle network. PTL 3 proposes a network anomaly determination apparatus capable of detecting anomalies reflecting trends in time series data. PTL 4 proposes an in-vehicle network that improves security.

CITATION LIST

Patent Literature

PTL 1: Japanese Unexamined Patent Application Publication No. 2015-136107
PTL 2: Japanese Unexamined Patent Application Publication No. 2016-151871
PTL 3: Japanese Unexamined Patent Application Publication No. 2008-146157
PTL 4: Japanese Unexamined Patent Application Publication No. 2016-129314

SUMMARY

However, the system in PTL 1, the in-vehicle system in PTL 2, the network anomaly determination apparatus in PTL 3, and the in-vehicle network in PTL 4 can be improved upon.

In view of this, the present disclosure provides a vehicle system and the like that can improve upon the above related art.

A vehicle system according to one aspect of the present disclosure is a vehicle system used for a vehicle, the vehicle system including: a plurality of in-vehicle apparatuses installed in the vehicle; and at least one of (i) a controller that, in accordance with a depth of penetration of a malicious attack carried out on the plurality of in-vehicle apparatuses, changes at least one of a communication method with an outside of the vehicle, a defense method against the malicious attack, or a storage method for logs pertaining to the plurality of in-vehicle apparatuses, or (ii) a determiner that determines whether or not the malicious attack is being carried out based on anomaly detection in the plurality of in-vehicle apparatuses.

Note that these comprehensive or specific aspects may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

A vehicle system and the like according to one aspect of the present disclosure can improve upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 7 is a table showing an example of control when a monitoring ECU or a monitoring block performs control in the first penetration example.
FIG. 8 is a table showing an example of control when a GW performs control in the first penetration example.
FIG. 9 is a table showing an example of control when an ADAS ECU performs control in the first penetration example.
FIG. 10 is a table showing an example of control when a V2X ECU performs control in the first penetration example.
FIG. 11 is a table showing an example of control when an IVI performs control in the first penetration example.
FIG. 13 is a table showing an example of control when a monitoring ECU or a monitoring block performs control in the second penetration example.
FIG. 14 is a table showing an example of control when a GW performs control in the second penetration example.
FIG. 17 is a table showing an example of control when an ADAS ECU performs control in the third penetration example.

FIG. 25 is a table illustrating a plurality of anomaly detection results that have already been stored, according to Embodiment 2.

FIG. 26 is a table illustrating a new anomaly detection result and a plurality of anomaly detection results to be extracted, according to Embodiment 2.

DESCRIPTION OF EMBODIMENTS

Figure 1:
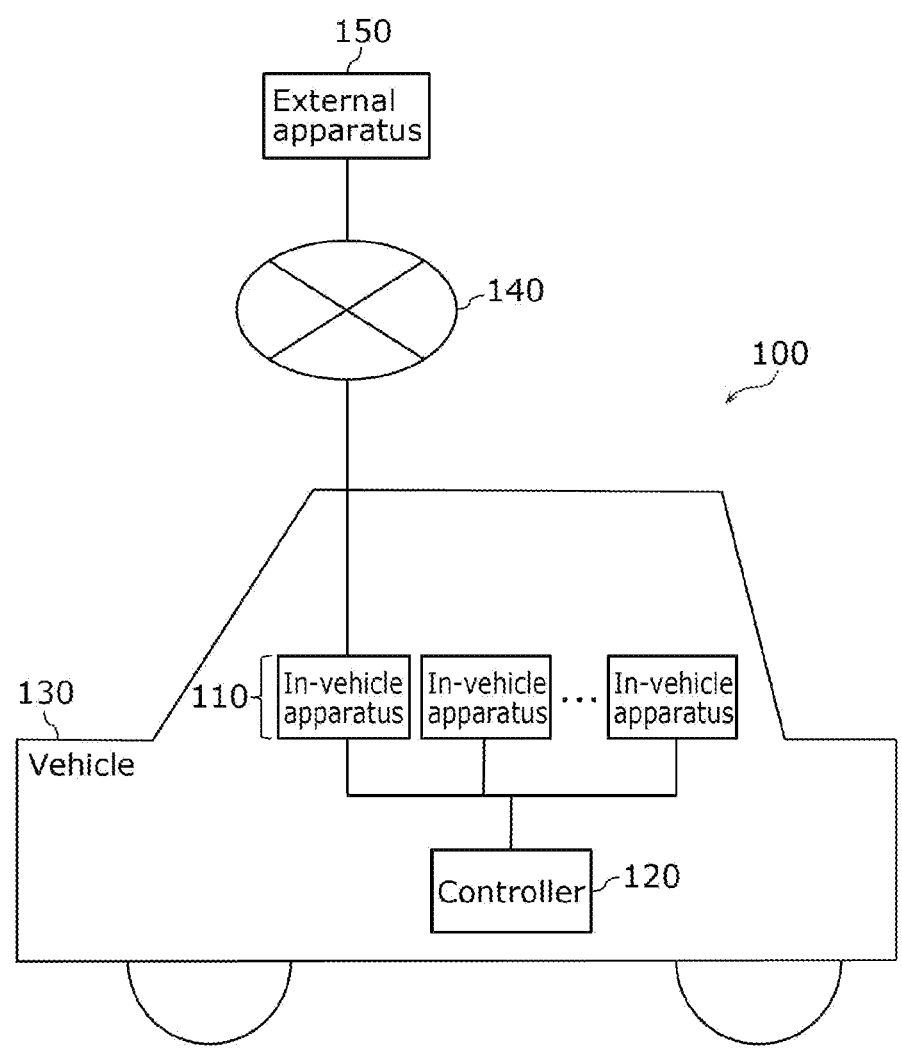
FIG. 1 is a block diagram illustrating the configuration of a vehicle system and the like according to Embodiment 1.

Underlying Knowledge Forming Basis of Present Disclosure

Automobiles provided with a function for being continuously connected to the Internet are called "connected cars". Connected cars are susceptible to hacking, and are therefore provided with defense functions as well. However, connected cars may be used for long periods of time, such as ten years or more, and the defense functions may therefore become obsolete. Therefore, systems that detect obsolescence in defense functions installed in a connected car and new attacks that were not conceived of when the connected car was shipped by, for example, having servers continuously (remotely) monitor the connected car, are being considered.

In such a detection system, logs are transmitted from the connected car to the server at regular or specific times, for example. Then, hacking, attacks, or the like are detected by the server through logs.

However, depending on the hack, the attack, the communication conditions, or the like, it may be difficult for the connected car to transmit logs. With respect to this, a method of storing logs in a communication buffer when the logs cannot be transmitted, and then transmitting the logs when the logs can be transmitted, can be used.

However, in vehicle systems used for vehicles, control in response to attacks may not be appropriate depending on the effects of the attack. For example, depending on the attack, it is also possible that the transmission is obstructed. There is also the possibility of an attacker intercepting the content of the transmission. In view of this, the present disclosure provides a vehicle system and the like that can perform adaptive control in response to attacks.

Specifically, a vehicle system according to one aspect of the present disclosure is a vehicle system used for a vehicle. The vehicle system includes: a plurality of in-vehicle apparatuses installed in the vehicle; and at least one of (i) a controller that, in accordance with a depth of penetration of a malicious attack carried out on the plurality of in-vehicle apparatuses, changes at least one of a communication method with an outside of the vehicle, a defense method against the malicious attack, or a storage method for logs pertaining to the plurality of in-vehicle apparatuses, or (ii) a determiner that determines whether or not the malicious attack is being carried out based on anomaly detection in the plurality of in-vehicle apparatuses.

Through this, the vehicle system may be capable of changing the communication method, the defense method, the storage method, or the like in accordance with the circumstances of the attack. Alternatively, the vehicle system may be capable of appropriately determining whether or not a malicious attack is being carried out. Therefore, the vehicle system may be capable of performing adaptive control in response to an attack.

For example, the controller may change the communication method by changing an in-vehicle apparatus that is used to communicate with the outside of the vehicle, among the plurality of in-vehicle apparatuses, in accordance with the depth of penetration.

Through this, the vehicle system may be capable of adaptively changing the in-vehicle apparatus used for communication according to circumstances of the attack. Therefore, the vehicle system may be capable of suppressing the effects of an attack.

Additionally, for example, the plurality of in-vehicle apparatuses may include a telematics communication unit, and when the depth of penetration reaches the telematics communication unit, the controller may change the communication method from a first communication method that is performed through the telematics communication unit to a second communication method that is not performed through the telematics communication unit.

Through this, the vehicle system may be capable of performing communication appropriately without going through the attacked telematics communication unit.

Additionally, for example, the plurality of in-vehicle apparatuses may include in-vehicle infotainment, and when the depth of penetration reaches the telematics communication unit, the controller may change the communication method from the first communication method that is performed through the telematics communication unit to the second communication method that is performed through the in-vehicle infotainment.

Through this, the vehicle system may be capable of performing communication appropriately through the in-vehicle infotainment, without going through the attacked telematics communication unit.

Additionally, for example, when the depth of penetration reaches the in-vehicle infotainment, the controller may change the communication method to a third communication method that is not performed through the in-vehicle infotainment.

Through this, the vehicle system may be capable of performing communication appropriately without going through the attacked in-vehicle infotainment.

Additionally, for example, the controller may change the storage method by changing an in-vehicle apparatus that is used as a storage location of the logs, among the plurality of in-vehicle apparatuses, in accordance with the depth of penetration.

Through this, the vehicle system may be capable of adaptively changing the storage location of logs according to circumstances of the attack. Therefore, the vehicle system may be capable of suppressing the effects of an attack.

Additionally, for example, when the depth of penetration reaches one or more in-vehicle apparatuses included in the plurality of in-vehicle apparatuses, the controller may change the storage method by including a log of each of the one or more in-vehicle apparatuses as a log to be stored.

Through this, when one or more in-vehicle apparatuses have been attacked, the vehicle system may be capable of including the logs of the attacked one or more in-vehicle apparatuses as a log to be stored.

Additionally, for example, the plurality of in-vehicle apparatuses may include a telematics communication unit, and when the depth of penetration reaches the telematics communication unit, the controller may change the storage method by including a log of the telematics communication unit as the log to be stored.

Through this, when the telematics communication unit has been attacked, the vehicle system may be capable of including the log of the attacked telematics communication unit as the log to be stored.

Additionally, for example, the plurality of in-vehicle apparatuses may include in-vehicle infotainment, and when the depth of penetration reaches the in-vehicle infotainment, the controller may change the storage method by including a log of the in-vehicle infotainment as the log to be stored.

Through this, when the in-vehicle infotainment has been attacked, the vehicle system may be capable of including the log of the attacked in-vehicle infotainment as the log to be stored.

Additionally, for example, when the depth of penetration reaches a first in-vehicle apparatus included in the plurality of in-vehicle apparatuses, the controller may change the storage method by including a log of a second in-vehicle apparatus as a log to be stored, the second in-vehicle apparatus being included in the plurality of in-vehicle apparatuses and assumed to be an in-vehicle apparatus to be reached next by the depth of penetration after the first in-vehicle apparatus.

Through this, the vehicle system may be capable of including, as a log to be stored, a log of the in-vehicle apparatus which may be attacked next.

Additionally, for example, at least some of the plurality of in-vehicle apparatuses may communicate over two communication channels. The controller changes the defense method by (i) causing the at least some of the plurality of in-vehicle apparatuses to continue communicating over one of the two communication channels when the depth of penetration reaches the other of the two communication channels, and (ii) stopping autonomous driving, stopping travel of the vehicle, or performing failsafe control when the depth of penetration reaches both of the two communication channels.

Through this, the vehicle system may be capable of using different defense methods for when one of the two communication channels has been attacked, and when the two communication channels have been attacked. The vehicle system may then be capable of changing the defense method appropriately according to the circumstances of the attack.

Additionally, for example, the plurality of in-vehicle apparatuses may include in-vehicle infotainment, and the in-vehicle infotainment may include the controller.

Through this, the vehicle system may be capable of performing adaptive control in response to an attack, using the in-vehicle infotainment provided in the vehicle.

Additionally, for example, the plurality of in-vehicle apparatuses may include a gateway, the gateway may include the controller, and the controller may store some or all of the logs in an in-vehicle apparatus that is not the gateway, of the plurality of in-vehicle apparatuses.

Through this, the vehicle system may be capable of performing adaptive control in response to an attack, using the gateway provided in the vehicle. Then, even when the gateway is low on memory, the vehicle system may be capable of storing the logs in another in-vehicle apparatus.

Additionally, for example, the determiner may, in accordance with an order in which anomalies have occurred in the plurality of in-vehicle apparatuses, determine whether or not the malicious attack is being carried out.

Through this, the vehicle system may be capable of appropriately determining whether or not a malicious attack is being carried out. Then, the vehicle system may be capable of performing appropriate control according to whether or not a malicious attack is being carried out.

Additionally, for example, the determiner may determine that the malicious attack is being carried out when the anomaly detection matches a predetermined order, and the predetermined order is an order in which at least two in-vehicle apparatuses of the plurality of in-vehicle apparatuses are arranged from shallower to deeper in a predetermined penetration route.

Through this, the vehicle system may be capable of appropriately determining that an anomaly occurring along the predetermined penetration route is a malicious attack.

Additionally, an information processing method according to one aspect of the present disclosure may be an information processing method performed by a vehicle system used for a vehicle. The information processing method may include at least one of (i) a control method of changing, in accordance with a depth of penetration of a malicious attack carried out on a plurality of in-vehicle apparatuses installed in the vehicle, at least one of a communication method with an outside of the vehicle, a defense method against the malicious attack, or a storage method for logs pertaining to the plurality of in-vehicle apparatuses, or (ii) a determination method of determining whether or not the malicious attack is being carried out based on anomaly detection in the plurality of in-vehicle apparatuses.

Through this, the vehicle system or the like that uses this information processing method may be capable of changing the communication method, the defense method, the storage method, or the like in accordance with the circumstances of the attack. Alternatively, the vehicle system or the like that uses this information processing method may be capable of appropriately determining whether or not a malicious attack is being carried out. Therefore, the vehicle system or the like that uses this information processing method may be capable of performing adaptive control in response to an attack.

Additionally, a recording medium according to one aspect of the present disclosure is a non-transitory computer-readable recording medium having recorded thereon a program for causing a computer to execute the above-described information processing method.

Through this, the computer or the like that executes this program may be capable of changing the communication method, the defense method, the storage method, or the like in accordance with the circumstances of the attack. Alternatively, the computer or the like that executes this program may be capable of appropriately determining whether or not a malicious attack is being carried out. Therefore, the computer or the like that executes the program may be capable of performing adaptive control in response to an attack.

Furthermore, these comprehensive or specific aspects of the may be realized by a system, a device, a method, an integrated circuit, a computer program, or a non-transitory computer-readable recording medium such as a CD-ROM, or may be implemented by any desired combination of systems, devices, methods, integrated circuits, computer programs, and recording media.

Embodiments will be described in detail hereinafter with reference to the drawings. Note that the following embodiments describe comprehensive or specific examples of the present disclosure. The numerical values, shapes, materials, constituent elements, arrangements and connection states of constituent elements, steps, orders of steps, and the like in the following embodiments are merely examples, and are not intended to limit the scope of claims. Additionally, of the constituent elements in the following embodiments, constituent elements not denoted in the independent claims, which express the broadest interpretation, will be described as optional constituent elements.

Embodiment 1

FIG. 1 is a block diagram illustrating the configuration of a vehicle system and the like according to the present embodiment. Vehicle system 100 illustrated in FIG. 1 includes a plurality of in-vehicle apparatuses 110 and controller 120. Basically, vehicle system 100 is an in-vehicle system in which some or all of the constituent elements included in vehicle system 100 are installed in vehicle 130. At least one in-vehicle apparatus 110 is connected to external apparatus 150 over external network 140.

Each in-vehicle apparatus 110 is an apparatus installed in vehicle 130. For example, the plurality of in-vehicle apparatuses 110 may include one or more electronic control units (ECUs).

Additionally, the plurality of in-vehicle apparatuses 110 may include a telematics communication unit (TCU). Additionally, the plurality of in-vehicle apparatuses 110 may include in-vehicle infotainment (IVI). Additionally, the plurality of in-vehicle apparatuses 110 may include a gateway (GW).

For example, the plurality of in-vehicle apparatuses 110 are connected to each other over an in-vehicle network. Additionally, first in-vehicle apparatus 110 in the plurality of in-vehicle apparatuses 110 may communicate with third in-vehicle apparatus 110 in the plurality of in-vehicle apparatuses 110 via second in-vehicle apparatus 110 in the plurality of in-vehicle apparatuses 110.

Controller 120 is a controller that controls the plurality of in-vehicle apparatuses 110. Controller 120 is not limited to being connected directly to each in-vehicle apparatus 110, and may be connected via one in-vehicle apparatus 110 to another in-vehicle apparatus 110. Controller 120 may then control the other in-vehicle apparatus 110 via the one in-vehicle apparatus 110.

Additionally, controller 120 may be included in any one of the plurality of in-vehicle apparatuses 110. Specifically, controller 120 may be included in a TCU included in the plurality of in-vehicle apparatuses 110. Alternatively, controller 120 may be included in an IVI included in the plurality of in-vehicle apparatuses 110. Alternatively, controller 120 may be included in a GW included in the plurality of in-vehicle apparatuses 110. Alternatively, controller 120 may be included in another in-vehicle apparatus 110.

Additionally, in accordance with a depth of penetration of a malicious attack carried out on the plurality of in-vehicle apparatuses 110, controller 120 changes at least one of a communication method with an exterior of vehicle 130, a defense method against the malicious attack, or a storage method for a log pertaining to the plurality of in-vehicle apparatuses 110. For example, controller 120 changes at least one of the communication method, the defense method, or the storage method in accordance with a change in the depth of penetration.

The depth of penetration of a malicious attack on vehicle 130 is determined to have advanced, for example, at a stage where the attack results in a state in which a program operates as intended by the attacker in in-vehicle apparatus 110, which is an ECU or the like. However, in a state where the operation of the program in the attacked in-vehicle apparatus 110, such as an ECU or the like, affects a plurality of functions or a plurality of ECUs or the like, it is determined that the depth has advanced only to the attacked ECU or the like, but has not advanced to other related ECUs and the like (ECUs or the like that are affected).

Vehicle 130 is a vehicle that travels on a road. Basically, vehicle system 100 is installed in vehicle 130. Vehicle 130 may be a gasoline automobile, an electric automobile, a hybrid automobile, or another type of automobile.

External network 140 is a network that communicates with the exterior of vehicle 130. External network 140 is the Internet, for example. At least one in-vehicle apparatus 110 is connected to external network 140 wirelessly.

External apparatus 150 is an apparatus outside vehicle 130. For example, external apparatus 150 is a server. External apparatus 150 and at least one in-vehicle apparatus 110 communicate with each other over external network 140.

Figure 2:
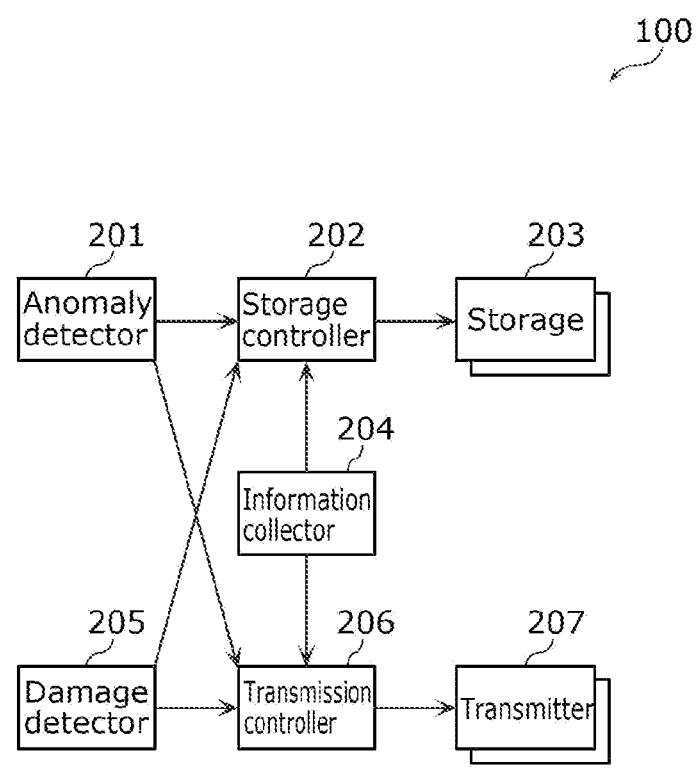
FIG. 2 is a schematic diagram illustrating function blocks of the vehicle system according to Embodiment 1.

FIG. 2 is a schematic diagram illustrating function blocks of vehicle system 100 illustrated in FIG. 1. Vehicle system 100 includes, for example, anomaly detector 201, storage controller 202, at least one storage 203, information collector 204, damage detector 205, transmission controller 206, and at least one transmitter 207.

These constituent elements may be included in controller 120 illustrated in FIG. 1, or may be included in the plurality of in-vehicle apparatuses 110 illustrated in FIG. 1. Alternatively, anomaly detector 201, storage controller 202, information collector 204, damage detector 205, and transmission controller 206 may be included in controller 120. The at least one storage 203 and the at least one transmitter 207 may be included in the plurality of in-vehicle apparatuses 110.

Anomaly detector 201 is an information processor that detects an anomaly in in-vehicle apparatus 110 or the in-vehicle network. For example, anomaly detector 201 is included in in-vehicle apparatus 110, and detects an anomaly in that in-vehicle apparatus 110 by monitoring that in-vehicle apparatus 110. Additionally, anomaly detector 201 may detect an anomaly in in-vehicle apparatus 110 by monitoring that in-vehicle apparatus 110 over a network. Anomaly detector 201 may monitor the in-vehicle network and detect an anomaly in the in-vehicle network.

Additionally, for example, anomaly detector 201 may detect an anomaly in in-vehicle apparatus 110 or the in-vehicle network in accordance with a log or the like of in-vehicle apparatus 110 or the in-vehicle network.

Damage detector 205 is an information processor that detects damage in vehicle 130, in-vehicle apparatus 110, or the in-vehicle network. For example, damage detector 205 detects a state in which normal operations are not performed. Damage detector 205 may detect an operation anomaly, stopped operations, decreased response, excessive response, or the like in vehicle 130, in-vehicle apparatus 110, or the in-vehicle network. Additionally, the detection performed by anomaly detector 201 and the detection performed by damage detector 205 may partially overlap. The anomaly may include the damage, or the damage may include the anomaly.

Additionally, for example, damage detector 205 may detect damage in vehicle 130, in-vehicle apparatus 110, or the in-vehicle network in accordance with a log or the like of in-vehicle apparatus 110 or the in-vehicle network.

Storage controller 202 is an information processor that controls storage of information. For example, storage controller 202 controls a storage location, a storage format, a storage timing, information to be stored, and the like in accordance with detection results from anomaly detector 201 and damage detector 205.

Specifically, when each of the GW, the TCU, and the IVI includes storage 203, storage controller 202 controls which of the plurality of storages 203 included in the GW, the TCU, and the IVI in which information is to be stored. Storage controller 202 may also control a security level of the information to be stored. For example, storage controller 202 may control whether or not to add a signature to the information to be stored. Storage controller 202 may also control a storage frequency.

Additionally, storage controller 202 may determine that all logs within a set period including a time at which an anomaly has occurred as the information to be stored, or may determine the information to be stored from among all logs, anomalous logs, normal logs, sampling logs, and the like. Additionally, storage controller 202 may collect information from in-vehicle apparatus 110, the in-vehicle network, and the like via information collector 204, and store the collected information in storage 203.

Storage 203 is an information processor that stores information. For example, storage 203 is storage such as memory or the like. Information is stored in storage 203 as a result of storage controller 202 storing the information in storage 203.

Additionally, vehicle system 100 may include a single storage 203, or may include a plurality of storages 203. Additionally, a single in-vehicle apparatus 110 may include a plurality of storages 203, or each of the plurality of in-vehicle apparatuses 110 may include at least one storage 203. Additionally, controller 120 may include storage 203.

Transmission controller 206 is an information processor that controls transmission of information. For example, transmission controller 206 controls a transmission destination, a transmission path, a transmission timing, information to be transmitted, and the like in accordance with detection results from anomaly detector 201 and damage detector 205.

Specifically, transmission controller 206 may select the transmission destination from among a server, infrastructure, an information terminal, another vehicle, and the like. Additionally, transmission controller 206 may select the transmission path from among a mobile phone network, WiFi (registered trademark), DSRC (Dedicated Short Range Communications), V2V, and the like. Transmission controller 206 may also control a transmission frequency.

Additionally, transmission controller 206 may determine that all logs within a set period including a time at which an anomaly has occurred as the information to be transmitted, or may determine the information to be transmitted from among all logs, anomalous logs, normal logs, sampling logs, and the like. Additionally, transmission controller 206 may collect information from in-vehicle apparatus 110, the in-vehicle network, and the like via information collector 204, and cause transmitter 207 to transmit the collected information.

Transmitter 207 is an information processor that transmits information. For example, transmitter 207 may include an antenna for transmitting information wirelessly. Transmitter 207 transmits information as a result of transmission controller 206 causing transmitter 207 to transmit the information.

Additionally, vehicle system 100 may include a single transmitter 207, or may include a plurality of transmitters 207. Additionally, a single in-vehicle apparatus 110 may include a plurality of transmitters 207, or each of the plurality of in-vehicle apparatuses 110 may include at least one transmitter 207. Additionally, controller 120 may include transmitter 207.

Information collector 204 is an information processor that collects information. For example, information collector 204 collects the information to be stored, the information to be transmitted, and the like from the plurality of in-vehicle apparatuses 110, the in-vehicle network, and the like. Information collector 204 may collect the information to be stored, the information to be transmitted, and the like from in-vehicle apparatus 110 over the in-vehicle network. Additionally, information collector 204 may collect the information to be stored, the information to be transmitted, and the like from one in-vehicle apparatus 110 via the in-vehicle network, another in-vehicle apparatus 110, and the like.

For example, controller 120 may include storage controller 202, transmission controller 206, and the like, and may change a log storage method, a log transmission method, and the like in accordance with the depth of penetration of a malicious attack carried out on the plurality of in-vehicle apparatuses 110. Note that the configuration illustrated in FIG. 2 is an example, and the configuration of vehicle system 100 is not limited to the example illustrated in FIG. 2.

Figure 3:
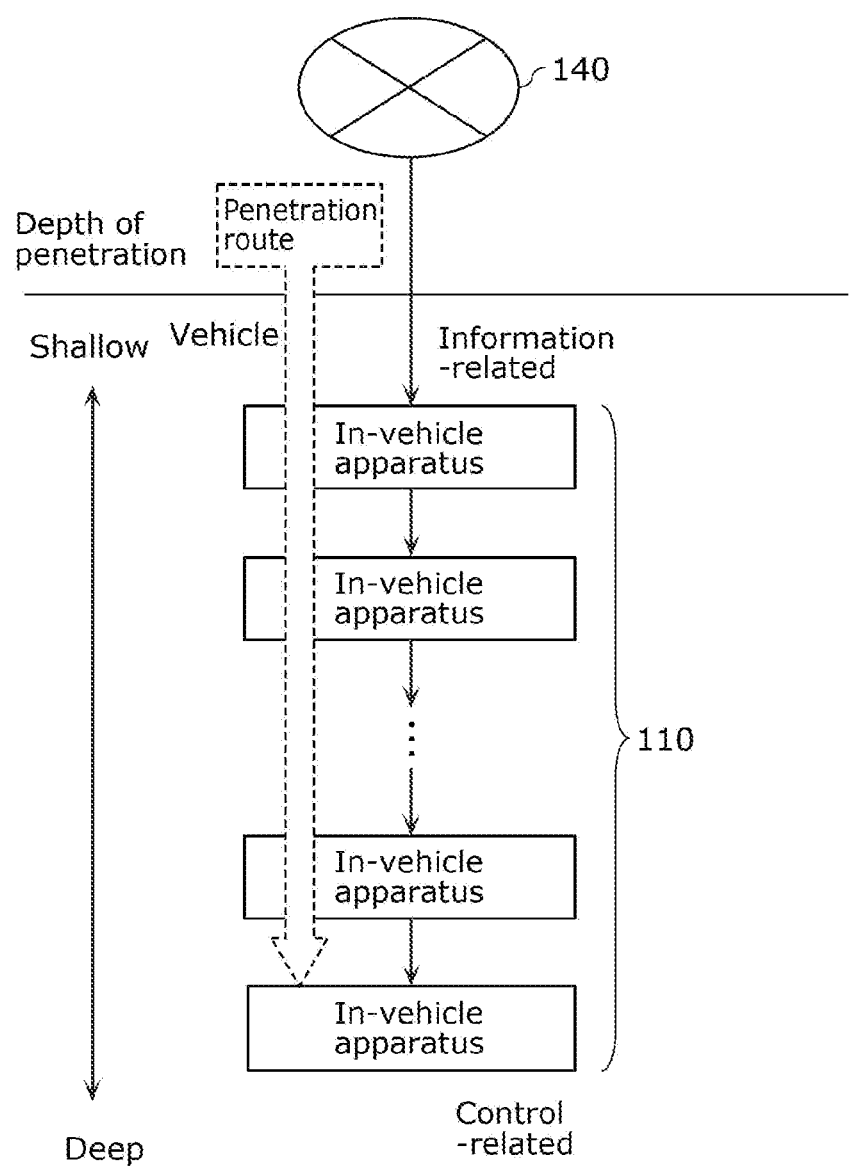
FIG. 3 is a conceptual diagram illustrating depths of penetrations according to Embodiment 1.

FIG. 3 is a conceptual diagram illustrating depths of penetrations in vehicle system 100 illustrated in FIG. 1. Vehicle system 100 is connected to external network 140. As such, a malicious attack may penetrate vehicle system 100 from external network 140.

For example, the plurality of in-vehicle apparatuses 110 in vehicle system 100 include in-vehicle apparatus 110 connected directly to external network 140, and in-vehicle apparatus 110 connected to external network 140 via another in-vehicle apparatus 110. Furthermore, the plurality of in-vehicle apparatuses 110 in vehicle system 100 include in-vehicle apparatus 110 connected to external network 140 via at least two other in-vehicle apparatuses 110.

As a result, the plurality of in-vehicle apparatuses 110 in vehicle system 100 can include in-vehicle apparatuses 110 close to external network 140 in a communication path, and in-vehicle apparatuses 110 far from external network 140 in the communication path. Basically, a malicious attack on vehicle system 100 is carried out from in-vehicle apparatuses 110 close to external network 140, and is then carried out in sequence on in-vehicle apparatuses 110 far from external network 140.

Additionally, basically, in-vehicle apparatus 110 close to external network 140 is an information-related in-vehicle apparatus which has a shallow relationship with drive control of vehicle 130, whereas in-vehicle apparatuses 110 far from external network 140 is a control-related in-vehicle apparatus which has a deep relationship with the drive control of vehicle 130. In other words, a malicious attack is carried out starting with an information-related in-vehicle apparatuses 110 which has a shallow relationship with the drive control of vehicle 130, and is progressively carried out against control-related in-vehicle apparatuses 110 which has a deep relationship with drive control of vehicle 130.

For example, an information-related in-vehicle apparatuses 110 experiences a malicious attack and is hijacked by an attacker, and next, in-vehicle apparatuses 110 close to drive control of vehicle 130 experiences a malicious attack. Ultimately, it is possible that a control-related in-vehicle apparatuses 110, which has a deep relationship with the drive control of vehicle 130, will experience a malicious attack and be hijacked by the attacker, and vehicle 130 will be under the attacker's control.

As described above, malicious attacks on vehicle system 100 are carried out, for example, in sequence on in-vehicle apparatuses 110 close to external network 140, and then on in-vehicle apparatuses 110 far from external network 140. Malicious attacks on vehicle system 100 are also carried out in sequence from, for example, an information-related in-vehicle apparatuses 110 to a control-related in-vehicle apparatuses 110. In addition, malicious attacks on vehicle system 100 are carried out by following a penetration route to a plurality of in-vehicle apparatuses 110.

The extent to which a malicious attack has penetrated vehicle system 100 can be expressed as a "depth of penetration". When the penetration is located close to external network 140, the penetration can be described as "shallow". When the penetration is located far from external network 140, the penetration can be described as "deep".

The depth of penetration may be evaluated in a relative manner, by comparing with other forms of penetration. For example, an order is defined for the plurality of in-vehicle apparatuses 110 based on an assumed predetermined penetration route. Specifically, first in-vehicle apparatus 110, second in-vehicle apparatus 110, and so on are defined. The penetration of a malicious attack on first in-vehicle apparatus 110 may then be evaluated as shallower than the penetration of a malicious attack on second in-vehicle apparatus 110.

Alternatively, the depth of penetration may be defined by an absolute number. For example, the depth of penetration may be defined by the number of in-vehicle apparatuses 110 that are passed through to reach the attacked in-vehicle apparatus 110 in the assumed predetermined penetration route.

Additionally, the depth of penetration is not limited to being defined for in-vehicle apparatus 110, among the plurality of in-vehicle apparatuses 110, which has experienced a malicious attack, and may be defined according to the degree of penetration for each in-vehicle apparatus 110.

For example, the depth of penetration in a state where in-vehicle apparatus 110 is under a malicious attack may be evaluated as shallower than the depth of penetration in a state where in-vehicle apparatus 110 has already been hijacked through a malicious attack. Additionally, when in-vehicle apparatus 110 has a plurality of functions, the depth of penetration may be defined in accordance with the number of functions that are under a malicious attack, a number of functions that have been hijacked, and so on. For example, the depth of penetration in the attack may be defined as deeper as the number of functions that are under malicious attack or have been hijacked increases.

More specifically, in-vehicle apparatus 110 may have two communication functions for communicating over two communication channels. In this case, a state in which two communication functions have been attacked or a state in which two communication functions have been hijacked may be defined as having a deeper depth of penetration than the depth of penetration in a state where one communication function has been attacked or one communication function has been hijacked.

The depth of penetration may be based on a plurality of layers in multilayer defense of vehicle system 100. For example, the depth of penetration may be specified in accordance with which number layer, of the plurality of layers in the multilayer defense, has experienced a malicious attack.

Note that the depth of penetration can also be expressed as a degree. In this case, the degree of penetration increases as the depth of penetration deepens. The depth of penetration can also be expressed as a progress of penetration. In this case, the progress of penetration advances as the depth of penetration deepens. The depth of penetration can also be expressed as a penetration achievement level. In this case, the penetration achievement level increases as the depth of penetration deepens.

When in-vehicle apparatus 110 or a function thereof has been attacked and hijacked, in-vehicle apparatus 110 or the function thereof will not operate properly. A state in which in-vehicle apparatus 110 or a function thereof has been attacked and hijacked can be described as a state in which the attack has succeeded. On the other hand, a state in which in-vehicle apparatuses 110 or a function thereof has been attacked but is not hijacked and continues to operate properly can be described as a state in which the attack has failed. The depth of penetration in the state in which the attack has succeeded may be defined as being deeper than the depth of penetration in the state in which the attack has failed.

Figure 4:
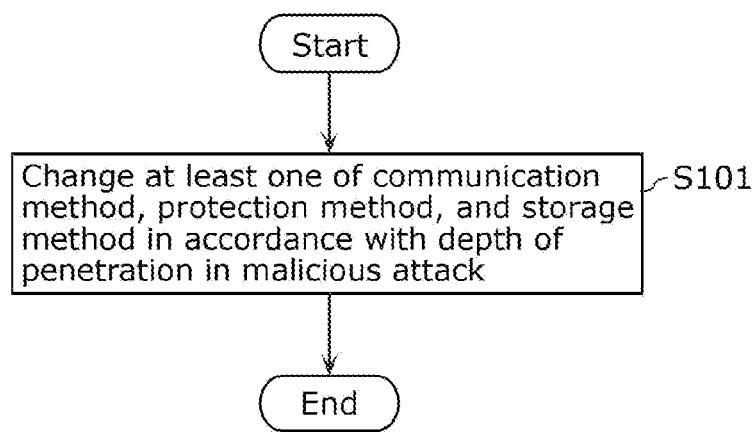
FIG. 4 is a flowchart illustrating operations of the vehicle system according to Embodiment 1.

FIG. 4 is a flowchart illustrating basic operations performed by vehicle system 100 illustrated in FIG. 1.

In accordance with the depth of penetration of a malicious attack carried out on the plurality of in-vehicle apparatuses 110, controller 120 changes at least one of a communication method with an exterior of vehicle 130, a defense method against the malicious attack, or a storage method for a log pertaining to the plurality of in-vehicle apparatuses 110 (S101). Here, the depth of penetration of a malicious attack may be the depth of penetration of a malicious attack on each of the plurality of in-vehicle apparatuses 110, or may be a depth of penetration of the malicious attacks on all of the plurality of in-vehicle apparatuses 110.

Specifically, controller 120 may change the communication method by changing at least one of a communication destination, a communication path, which in-vehicle apparatus 110 is used for communication, a communication frequency, a communication timing, or communication content. Additionally, controller 120 may change the defense method by changing an operation mode of vehicle 130, one or more in-vehicle apparatuses 110, or the like.

Additionally, controller 120 may change the storage method by changing at least one of a storage location, which in-vehicle apparatus 110 is used for the storage, a storage frequency, a storage timing, stored content, whether or not the stored content has a signature, or whether or not the stored content is encrypted.

For example, controller 120 use a different communication path for communication when the penetration is deep than when the penetration is shallow. Additionally, controller 120 may also cause the plurality of in-vehicle apparatuses 110 to perform different operations as a defense against the attack when the penetration is deep than when the penetration is shallow. Controller 120 may also store the logs in a different storage location when the penetration is deep than when the penetration is shallow.

Controller 120 may also collect a log of in-vehicle apparatus 110 in the penetration route and transmit or store the log of in-vehicle apparatus 110 in the penetration route according to the depth of penetration of the malicious attack.

Of the plurality of in-vehicle apparatuses 110 in vehicle system 100, in-vehicle apparatuses 110 that can be used differ between when the penetration is deep and when the penetration is shallow. Controller 120 may select in-vehicle apparatus 110 that can be used according to the depth of penetration and control the communication, defense, or storage so as to use in-vehicle apparatus 110 that can be used. In other words, controller 120 may control the communication, defense, or storage so that in-vehicle apparatus 110 which is being attacked is not used.

In this manner, controller 120 can change the communication method, the defense method, the storage method, or the like in accordance with the circumstances of the attack. In other words, controller 120 can perform adaptive control in response to an attack.

Additionally, controller 120 may detect an anomaly in each of the plurality of in-vehicle apparatuses 110. For example, when an anomaly occurs in one in-vehicle apparatus 110 among the plurality of in-vehicle apparatuses 110, controller 120 detects the anomaly that has occurred in the one in-vehicle apparatus 110. Controller 120 may collect the logs of each of the plurality of in-vehicle apparatuses 110 and detect an anomaly based on the logs, or may transmit commands to the plurality of in-vehicle apparatuses 110 and detect an anomaly based on responses.

Controller 120 may then estimate the depth of penetration of the malicious attack according to the detected anomaly. For example, controller 120 may estimate that the depth of penetration has reached in-vehicle apparatus 110 where the anomaly was detected. Controller 120 may then change the communication method, the defense method, the storage method, or the like according to the estimated depth.

The depth of penetration "reaching in-vehicle apparatus 110" can also be referred to as the penetration "reaching in-vehicle apparatus 110" or the attack "reaching in-vehicle apparatus 110".

More specific examples of the above-described vehicle system 100 will be described hereinafter with reference to FIGS. 5 to 17.

Figure 5:
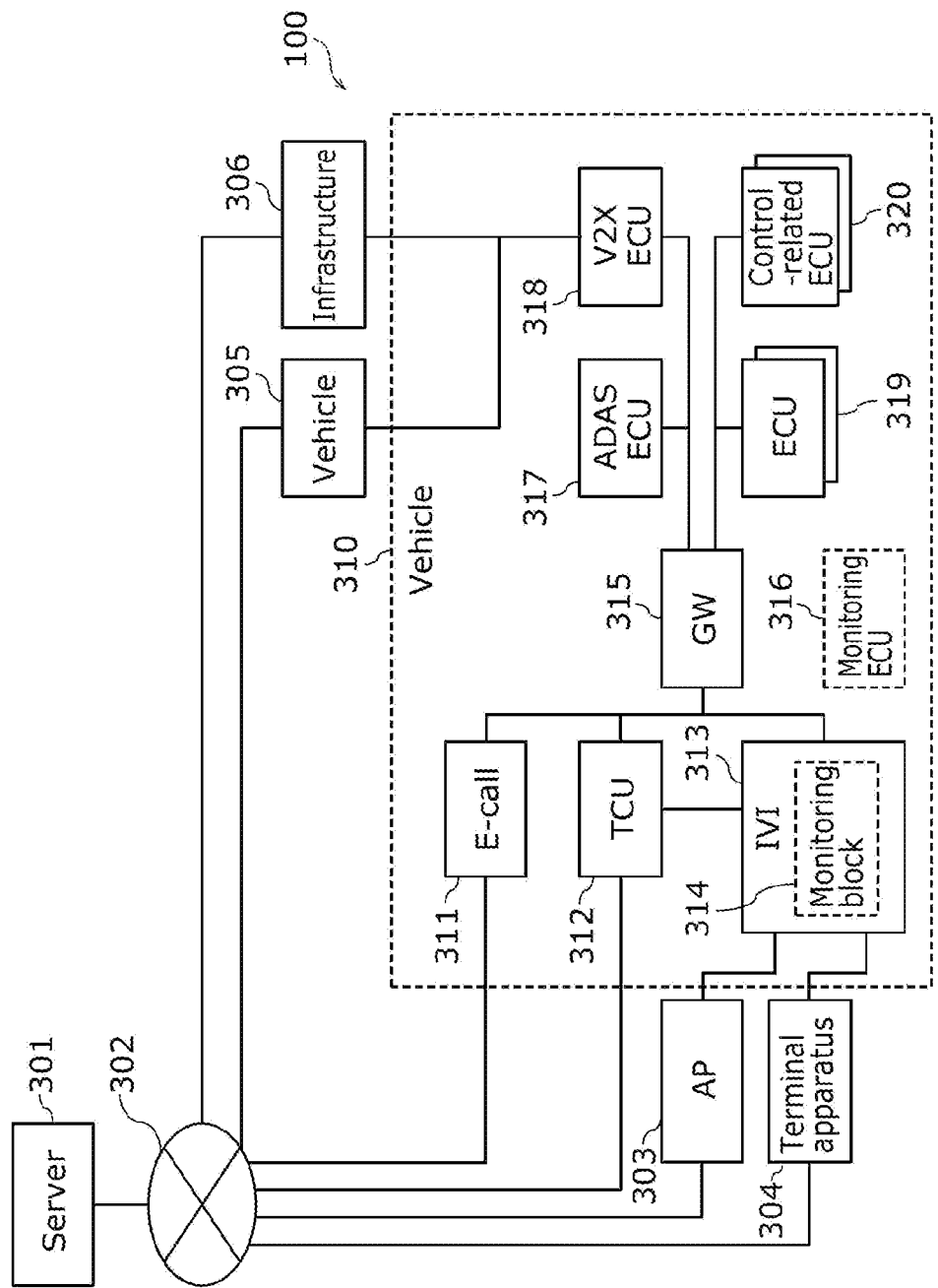
FIG. 5 is a block diagram illustrating a first specific example of the vehicle system according to Embodiment 1.

FIG. 5 is a block diagram illustrating a first specific example of vehicle system 100 illustrated in FIG. 1. Vehicle system 100 illustrated in FIG. 5 is installed in vehicle 310, and includes E-call 311, TCU 312, IVI 313, GW 315, ADAS ECU 317, V2X ECU 318, one or more ECUs 319, and one or more control-related ECUs 320. For example, TCU 312 and IVI 313 are connected by USB (Universal Serial Bus).

E-call 311, TCU 312, IVI 313, and GW 315 are connected by a CAN (Controller Area Network) or Ethernet (registered trademark). GW 315, ADAS ECU 317, and V2X ECU 318 are connected by a CAN or Ethernet (registered trademark). GW 315, the one or more ECUs 319, and the one or more control-related ECUs 320 are connected by a CAN or Ethernet (registered trademark).

Also, at least some constituent elements of vehicle system 100 may be connected to each other by both a CAN and Ethernet (registered trademark), and may be capable of communicating over both the CAN and Ethernet (registered trademark).

Here, a bus that connects ADAS ECU 317 and V2X ECU 318 is different from a bus that connects the one or more ECUs 319 and the one or more control-related ECUs 320. However, ADAS ECU 317, V2X ECU 318, the one or more ECUs 319, and the one or more control-related ECUs 320 may be connected by the same bus.

Additionally, E-call 311 and TCU 312 are connected to Internet 302 over a mobile phone network, and are connected to server 301 over Internet 302. IVI 313 is also connected to AP 303, terminal apparatus 304, or the like by Bluetooth (registered trademark), USB, or WiFi (registered trademark). IVI 313 is connected to Internet 302 via AP 303, terminal apparatus 304, or the like, and is connected to server 301 over Internet 302.

V2X ECU 318 is connected to vehicle 305 or infrastructure 306 by DSRC or WiFi (registered trademark). Additionally, vehicle 305 and infrastructure 306 are connected to Internet 302, and are connected to server 301 over Internet 302.

E-call 311, TCU 312, IVI 313, GW 315, ADAS ECU 317, V2X ECU 318, the one or more ECUs 319, and the one or more control-related ECUs 320 are examples of the plurality of in-vehicle apparatuses 110 illustrated in FIG. 1. Additionally, server 301 is an example of external apparatus 150 illustrated in FIG. 1. Internet 302 is an example of external network 140 illustrated in FIG. 1.

E-call 311 is an information processor that automatically transmits information in the event of an accident. E-call 311 can also be described as an automatic emergency call apparatus. For example, E-call 311 wirelessly connects to Internet 302 over the mobile phone network and transmits information to server 301 over Internet 302. E-call 311 may include an antenna for wireless communication. E-call 311 may also be integrated with TCU 312.

TCU (Telematics Communication Unit) 312 is an information processor that performs communication. For example, TCU 312 wirelessly connects to Internet 302 over the mobile phone network and communicates with server 301 over Internet 302. TCU 312 may include an antenna for wireless communication. TCU 312 may also be integrated with E-call 311.

IVI (in-vehicle infotainment) 313 is an information processor that provides information, entertainment, and the like. IVI 313 can also be described as an information provision apparatus. For example, IVI 313 is used as a car navigation system, a car audio system, a TV tuner, or the like.

For example, IVI 313 has a communication function such as Bluetooth (registered trademark), WiFi (registered trademark), or the like, and may be connected to AP 303, terminal apparatus 304, and the like. Furthermore, IVI 313 may connect to Internet 302 via AP 303, terminal apparatus 304, or the like, and communicate with server 301 over Internet 302. IVI 313 may also include an antenna for wireless communication.

GW (gateway) 315 is an information processor that connects to a plurality of networks, and transfers information from one network to another network. For example, GW 315 connects to a network including E-call 311, TCU 312, and IVI 313, a network including ADAS ECU 317 and V2X ECU 318, and a network including the one or more ECUs 319 and the one or more control-related ECUs 320.

GW 315 may be capable of communicating with each of the other constituent elements in vehicle 310 through a plurality of communication channels. For example, GW 315 may communicate through a CAN communication channel serving as a primary communication channel, and may communicate through an Ethernet (registered trademark) communication channel serving as a secondary communication channel. GW 315 may include independent hardware and software for each communication channel. Through this, even if GW 315 cannot use one communication channel, it may be possible to use the other communication channel. An operation mode in which a minimum level of control is performed through only one communication channel is called "safe mode".

ADAS (Advanced Driver Assistant System) ECU 317 is an information processor that supports driving operations of a driver of vehicle 310. For example, ADAS ECU 317 transmits signals for driving vehicle 310 to control-related ECUs 320 to provide driving assistance such as lane keeping, automatic braking, and the like. In other words, ADAS ECU 317 performs control for supporting the automation of the driving of vehicle 310.

V2X ECU 318 is an information processor that communicates with another vehicle 305, infrastructure 306, or the like. The communication with the other vehicle 305 is also called "vehicle-to-vehicle communication" (V2V). The communication with infrastructure 306 is also called "roadto-vehicle communication" (V2I). V2X ECU 318 can also be described as a "V2X communicator". For example, V2X ECU 318 wirelessly connects to and the other vehicle 305, infrastructure 306, and the like, and communicates with the other vehicle 305, infrastructure 306, and the like. V2X ECU 318 may include an antenna for wireless communication.

ECU 319 is an information processor that performs electronic control of vehicle 310. ECU 319 performs control that is different from the drive control of vehicle 310. ECU 319 may control the opening/closing of a window, and may control door locks.

Like ECU 319, control-related ECU 320 is an information processor that performs electronic control of vehicle 310. Control-related ECU 320 performs drive control of vehicle 310. Control-related ECU 320 may control the travel of vehicle 310, and may control the stopping of vehicle 310. Additionally, control-related ECU 320 may control the travel speed of vehicle 310, and may control the travel direction (steering) of vehicle 310.

Server 301 is an information processing apparatus that processes information. Server 301 communicates with vehicle 310 over Internet 302 or the like. For example, server 301 collects information such as logs from vehicle 310, obtains information on a malicious attack or the like by analyzing the information such as logs, and provides information on the malicious attack or the like to vehicle 310.

Internet 302 is a communication network for information communication. Server 301, vehicle 310, and the like communicate over Internet 302.

AP (access point) 303 is an information processing apparatus that performs wireless communication. AP 303 is also called a "wireless base station". For example, AP 303 communicates wirelessly with IVI 313. Additionally, AP 303 connects to Internet 302 wirelessly or over a wire, and communicates with server 301 over Internet 302. Through this, AP 303 relays communication between IVI 313 and server 301.

Terminal apparatus 304 is an information processing apparatus that performs communication. Terminal apparatus 304 may be a mobile information terminal, a mobile phone, a smartphone, or a tablet. For example, terminal apparatus 304 communicates with IVI 313 wirelessly or over a wire. Additionally, terminal apparatus 304 connects to Internet 302 wirelessly, and communicates with server 301 over Internet 302. Through this, terminal apparatus 304 relays communication between IVI 313 and server 301.

Vehicle 305 is a different vehicle from vehicle 310. Vehicle 305 and vehicle 310 perform vehicle-to-vehicle communication. Vehicle 305 may also be capable of connecting to Internet 302 and communicating with server 301 over Internet 302. Vehicle 305 may have the same configuration as vehicle 310.

Infrastructure 306 is equipment such as a road, a traffic signal, or the like. Infrastructure 306 performs road-to-vehicle communication with vehicle 310. Infrastructure 306 may also be capable of connecting to Internet 302 and communicating with server 301 over Internet 302.

Vehicle system 100 may further include monitoring ECU 316, which performs the role of controller 120.

Monitoring ECU 316 monitors E-call 311, TCU 312, IVI 313, GW 315, ADAS ECU 317, V2X ECU 318, the one or more ECUs 319, the one or more control-related ECUs 320, and the like included in vehicle system 100. Additionally, monitoring ECU 316 is connected to a plurality of in-vehicle networks, and monitors the plurality of in-vehicle networks.

Here, the plurality of in-vehicle networks include, for example, a plurality of buses for communicating over a CAN.

Monitoring ECU 316 may monitor, E-call 311, TCU 312, IVI 313, GW 315, ADAS ECU 317, V2X ECU 318, the one or more ECUs 319, the one or more control-related ECUs 320, and the like over one or more in-vehicle networks. For example, monitoring ECU 316 may obtain a log from each of the constituent elements and detect an improper operation according to the log. Alternatively, monitoring ECU 316 may transmit an instruction signal to each constituent element and detect an improper operation according to a response signal made in response thereto.

Instead of monitoring ECU 316, vehicle system 100 may include monitoring block 314, which performs the same role as monitoring ECU 316, in IVI 313. For example, monitoring block 314 may be provided in IVI 313 separate from the parts that provide the basic functions of IVI 313. Hypervisors, multi-CPU, multi-core, TrustZone (registered trademark), and the like may be used to implement monitoring block 314.

There are cases where, for example, constant transmission or emergency transmission of normal logs and anomalous logs to server 301 are blocked by a malicious attack. There are also cases where it is difficult to store accident verification logs in vehicle 310. Furthermore, there are cases where TCU 312 or GW 315 has been hijacked by a malicious attack and it is therefore difficult to defend against the malicious attack.

In response to such cases, for example, IVI 313 may be used to improve the dependability of vehicle system 100. Specifically, IVI 313 may store logs continuously and transmit the logs when communication is possible. IVI 313 may also use the resources of IVI 313 to identify the state of vehicle 310 and disable the ADAS in the event of an emergency.

IVI 313 may also use a security chip to store a log which has been signed in the event of an accident. IVI 313 may also monitor for hijacking of TCU 312 or GW 315 by using the security chip to guarantee integrity.

IVI 313 may be split into two or more blocks through a virtualization technique, CPU redundancy, or the like. Furthermore, as mentioned above, the monitoring function may be provided in a single block (monitoring block 314). Monitoring block 314 may then monitor TCU 312, GW 315, and the like and specify an anomaly and a state of damage.

Additionally, TCU 312 may perform periodic uploading of normal logs and emergency notifications in the event of an anomaly. On the other hand, in the event that TCU 312 cannot periodically upload a normal log, IVI 313 may temporarily store and re-upload the normal log.

Additionally, IVI 313 may collect, sort, store, and upload logs which require analysis in the event of an anomaly. IVI 313 may also detect when TCU 312 has been hijacked. Additionally, when TCU 312 has been hijacked, IVI 313 may communicate over a different communication path, such as over WiFi (registered trademark) or the like. IVI 313 may also store an evidence log.

Additionally, GW 315 may perform the monitoring, ADAS ECU 317 may perform the monitoring, or V2X ECU 318 may perform the monitoring, instead of IVI 313. Furthermore, GW 315 may be made redundant, ADAS ECU 317 may be made redundant, and V2X ECU 318 may be made redundant. In other words, monitoring block 314 may be provided in GW 315, may be provided in ADAS ECU 317, or may be provided in V2X ECU 318.

Figure 6:
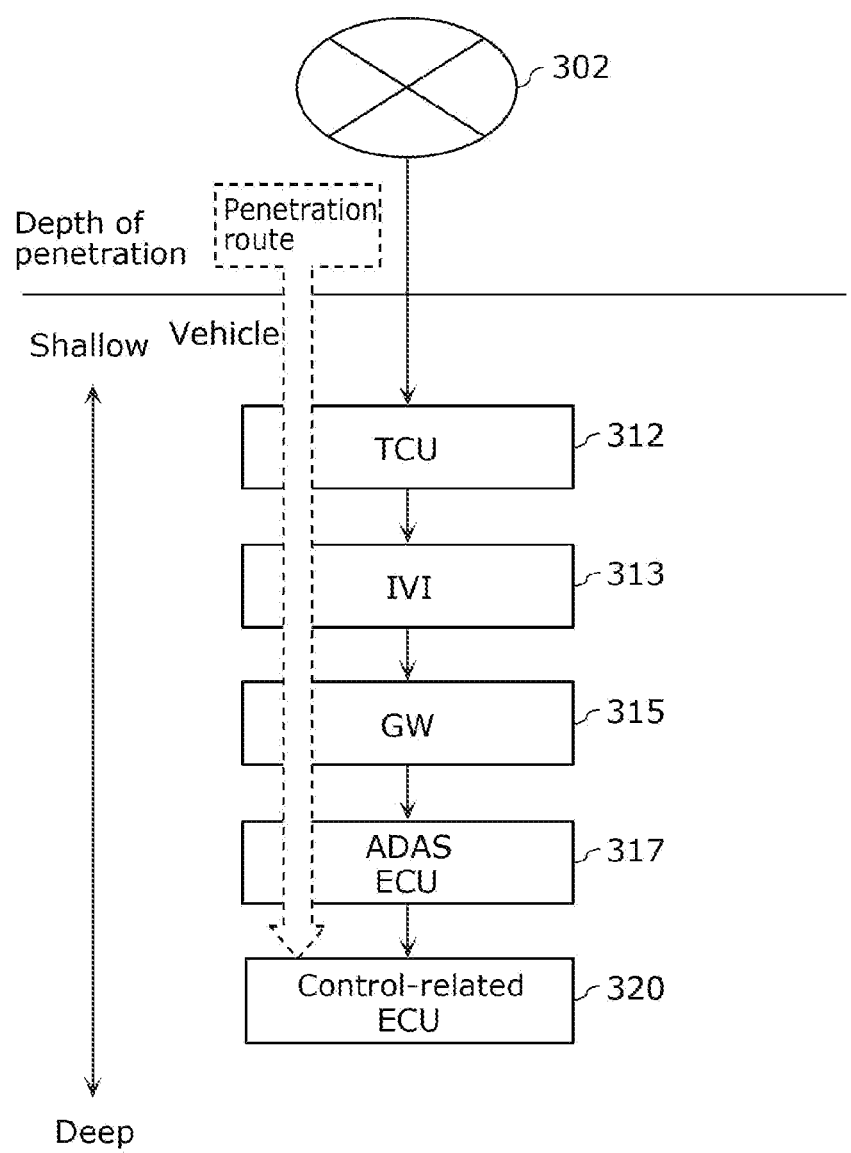
FIG. 6 is a conceptual diagram illustrating a first penetration example according to Embodiment 1.

FIG. 6 is a conceptual diagram illustrating a first penetration example in vehicle system 100 illustrated in FIG. 5. It is assumed, for example, that an attack is carried out on vehicle system 100 in the following order: TCU 312, IVI 313, GW 315, ADAS ECU 317, and control-related ECU 320.

Note that there are cases where an attack on TCU 312 is skipped. For example, when TCU 312 is used like a pipe, it is possible that IVI 313 will be attacked without TCU 312 being hijacked. There are also cases where an attack on ADAS ECU 317 is skipped. For example, when GW 315 has been hijacked, it is possible that control-related ECU 320 will be attacked without ADAS ECU 317 being attacked.

FIG. 7 is a table showing an example of control when monitoring ECU 316 or monitoring block 314 performs control in the first penetration example, in vehicle system 100 illustrated in FIG. 5. FIG. 7 illustrates control performed by monitoring ECU 316 or monitoring block 314 at each depth of penetration in the first penetration example. In this example, monitoring ECU 316 changes control pertaining to notifications, defense, and storage according to the depth of penetration. A stored log may be transmitted to server 301 through the same communication method as that used for notifications.

For example, when an attack on TCU 312 has failed, monitoring ECU 316 notifies server 301 of information on the attack through TCU 312. On the other hand, when an attack on TCU 312 has succeeded, monitoring ECU 316 notifies server 301 of information on the attack through IVI 313.

Additionally, when TCU 312 has been attacked, monitoring ECU 316 stops TCU 312 and switches a system of communication with the exterior to a communication system that does not go through TCU 312. Note that if the attack on TCU 312 has failed, monitoring ECU 316 may switch the system of communication with the exterior to a communication system that does not go through TCU 312 after first notifying server 301 of the information on the attack through TCU 312.

Additionally, when TCU 312 has been attacked, monitoring ECU 316 collects logs of TCU 312 and logs of the in-vehicle network to which TCU 312 is connected, adds a signature to the logs, and stores the logs in monitoring ECU 316. Specifically, monitoring ECU 316 stores the logs in memory provided in monitoring ECU 316. At this time, monitoring ECU 316 may add location information and a timestamp to the logs using GPS (Global Positioning System) and a GPS time.

Additionally, when IVI 313 has been attacked, if TCU 312 can be used, monitoring ECU 316 notifies server 301 of information on the attack through TCU 312. If TCU 312 cannot be used, monitoring ECU 316 notifies server 301 of information on the attack through V2X ECU 318 or E-call 311. If none of these can be used, monitoring ECU 316 notifies a user of information on the attack.

The same communication path will be used for the notification even if the penetration has reached deeper than IVI 313. Monitoring ECU 316 may change the information of the notification according to the depth.

Additionally, when IVI 313 has been attacked, monitoring ECU 316 stops IVI 313 and switches the system of communication with the exterior to a communication system that does not go through IVI 313. Additionally, when IVI 313 has been attacked, monitoring ECU 316 adds a log of IVI 313, and the log of the in-vehicle network to which IVI 313 is connected, to the logs to be stored. In other words, in this case, monitoring ECU 316 newly stores the log of IVI 313, as well as the log of the in-vehicle network to which IVI 313 is connected.

Additionally, when an attack on the communication function of one communication channel of GW 315, which has communication functions of two communication channels, has succeeded, monitoring ECU 316 switches the operation mode of GW 315 to safe mode through the other communication channel which can be used. Through this, only the other communication channel, which, of the two communication channels, can be used, is used for communication. When an attack on all the communication channels of GW 315 has succeeded, monitoring ECU 316 stops autonomous driving. Alternatively, in this case, monitoring ECU 316 transitions the autonomous driving to failsafe. Alternatively, in this case, monitoring ECU 316 may instruct vehicle 310 to stop traveling.

Additionally, when one communication channel of GW 315 has been attacked, monitoring ECU 316 notifies ADAS ECU 317, control-related ECU 320, or the like of information on the attacked communication channel. Through this, monitoring ECU 316 performs control so that ADAS ECU 317, control-related ECU 320, and the like do not receive signals from the attacked communication channel.

Additionally, when GW 315 has been attacked, monitoring ECU 316 overwrites an improper command with an error frame in the CAN. For example, when a command output from GW 315 has been detected, monitoring ECU 316 overwrites the command output from GW 315 with an error frame by outputting an error frame.

Additionally, when GW 315 has been attacked, monitoring ECU 316 adds a log of GW 315 to the logs to be stored. Monitoring ECU 316 may store the log of GW 315 for each of the communication channels.

Additionally, when ADAS ECU 317 or control-related ECU 320 has been attacked, monitoring ECU 316 may overwrite an improper command with an error frame in the CAN. For example, when a command output from ADAS ECU 317 or control-related ECU 320 has been detected, monitoring ECU 316 may output an error frame. As a result, the command output from ADAS ECU 317 or control-related ECU 320 is overwritten with an error frame.

Additionally, when ADAS ECU 317 or control-related ECU 320 has been attacked, monitoring ECU 316 adds a log of ADAS ECU 317 or control-related ECU 320 to the logs to be stored. In this case, monitoring ECU 316 may add a log of ADAS ECU 317, V2X ECU 318, the one or more ECUs 319, and the one or more control-related ECUs 320 to the logs to be stored. Monitoring ECU 316 may store these logs for each ECU.

Additionally, when ADAS ECU 317 or control-related ECU 320 has been attacked, monitoring ECU 316 may add a log of the in-vehicle network to which ADAS ECU 317 or control-related ECU 320 is connected to the logs to be stored. In this case, monitoring ECU 316 may add a log of the plurality of buses to which ADAS ECU 317, V2X ECU 318, the one or more ECUs 319, and the one or more control-related ECUs 320 are connected to the logs to be stored. Monitoring ECU 316 may store these logs for each bus.

The amount of information in a log increases with the depth of penetration. To increase the security, monitoring ECU 316 may store logs, or transmit logs, according to a deeper depth of penetration than a current depth of penetration. For example, when IVI 313 has been attacked, monitoring ECU 316 may include the log of GW 315 in the logs to be stored.

Additionally, although the foregoing describes operations of monitoring ECU 316, monitoring block 314 in IVI 313 may perform the same operations instead of monitoring ECU 316. In the configuration illustrated in FIG. 5, when GW 315 has been attacked, it may be difficult for monitoring block 314 to collect logs of control-related ECU 320 and the like through GW 315. However, if one of the two communication channels of GW 315 can be used, monitoring block 314 may collect the logs of control-related ECU 320 and the like through the communication channel that can be used.

Additionally, monitoring block 314 may store the logs in memory within monitoring block 314, or IVI 313 may store the logs in memory provided outside monitoring block 314. Additionally, if one of the two communication channels of GW 315 can be used, monitoring block 314 may, through the communication channel that can be used, instruct ECU 319 and the like to overwrite a command output by the attacked constituent element with an error frame.

FIG. 8 is a table showing an example of control when GW 315 performs control in the first penetration example, in vehicle system 100 illustrated in FIG. 5. FIG. 8 illustrates control performed by GW 315, instead of monitoring ECU 316 or monitoring block 314, at each depth of penetration in the first penetration example. In this example, GW 315 changes control pertaining to notifications, defense, and storage according to the depth of penetration.

When the depth of penetration corresponds to TCU 312 or IVI 313, the control performed by GW 315 is the same as the control performed by monitoring ECU 316 and the like, and is therefore the same control as that illustrated in FIG. 7. Accordingly, when the depth of penetration corresponds to TCU 312 or IVI 313, "monitoring ECU 316" can be replaced with "GW 315" in the descriptions referring to FIG. 7.

When an attack on one communication channel of the two communication channels of GW 315 has succeeded, GW 315 uses the other communication channel that can be used to notify server 301 through the same communication path as when the depth of penetration corresponds to TCU 312 or IVI 313. Even when the penetration has reached deeper than GW 315, GW 315 notifies server 301 through the same communication path using the other communication channel that can be used. GW 315 may change the information of the notification according to the depth.

Additionally, when an attack command has been detected, GW 315 may prohibit the transfer of that command. Additionally, when an attack on one communication channel of the two communication channels of GW 315 has succeeded, GW 315 stops the communication function of that communication channel and switches the operation mode to safe mode. When all the communication channels of GW 315 have been attacked, GW 315 stops autonomous driving. Alternatively, when all the communication channels of GW 315 have been attacked, GW 315 transitions the autonomous driving to failsafe. Alternatively, in this case, GW 315 may instruct vehicle 310 to stop traveling.

Additionally, by notifying ADAS ECU 317, control-related ECU 320, and the like of the attacked communication channel, GW 315 performs control so that ADAS ECU 317, control-related ECU 320, and the like do not receive signals from the attacked communication channel.

Additionally, when GW 315 has been attacked, GW 315 adds a log of GW 315 to the logs to be stored. GW 315 may store the log of GW 315 for each of the communication channels.

Additionally, when ADAS ECU 317 or control-related ECU 320 has been attacked, if one communication channel of GW 315 can be used, GW 315 adds a log of ADAS ECU 317 or control-related ECU 320 to the logs to be stored.

In other words, when ADAS ECU 317 or control-related ECU 320 has been attacked, GW 315 collects the log of ADAS ECU 317 or control-related ECU 320 through the communication channel that can be used, and stores the collected log. Additionally, in this case, GW 315 may add a log of ADAS ECU 317, V2X ECU 318, the one or more ECUs 319, and the one or more control-related ECUs 320 to the logs to be stored. GW 315 may store these logs for each ECU.

Additionally, when ADAS ECU 317 or control-related ECU 320 has been attacked, if one of the communication channels of GW 315 can be used, GW 315 may add a log of the in-vehicle network to which ADAS ECU 317 or control-related ECU 320 is connected to the logs to be stored.

In other words, when ADAS ECU 317 or control-related ECU 320 has been attacked, GW 315 collects the log of the in-vehicle network to which ADAS ECU 317 or control-related ECU 320 is connected through the communication channel that can be used, and stores the collected log. Additionally, in this case, GW 315 may add a log of the plurality of buses to which ADAS ECU 317, V2X ECU 318, the one or more ECUs 319, and the one or more control-related ECUs 320 are connected to the logs to be stored. GW 315 may store a log for each of the buses.

The amount of information in a log increases with the depth of penetration. To increase the security, GW 315 may store logs, or transmit logs, according to a deeper depth of penetration than a current depth of penetration. When IVI 313 has been attacked, GW 315 may include the log of GW 315 in the logs to be stored.

The capacity of the memory provided in GW 315 is basically small. Accordingly, GW 315 may store the minimum amount of logs in the memory provided in GW 315, and may store the remaining logs in the memory provided in IVI 313. Additionally, when IVI 313 is not under attack, GW 315 may store the remaining logs and the like in the memory provided in IVI 313.

Like monitoring block 314 in IVI 313, GW 315 may include a monitoring block, and the monitoring block in GW 315 may perform the control described above. As a result, the monitoring block in GW 315 can perform the same control as monitoring ECU 316.

FIG. 9 is a table showing an example of control when ADAS ECU 317 performs control in the first penetration example, in vehicle system 100 illustrated in FIG. 5. FIG. 9 illustrates control performed by ADAS ECU 317, instead of monitoring ECU 316 or monitoring block 314, at each depth of penetration in the first penetration example. In this example, ADAS ECU 317 changes control pertaining to notifications, defense, and storage according to the depth of penetration.

When the depth of penetration corresponds to one of TCU 312, IVI 313, and GW 315, the control performed by ADAS ECU 317 is the same as the control performed by monitoring ECU 316 and the like, and is therefore the same control as that illustrated in FIG. 7. Accordingly, when the depth of penetration corresponds to one of TCU 312, IVI 313, and GW 315, "monitoring ECU 316" can be replaced with "ADAS ECU 317" in the descriptions referring to FIG. 7.

However, when collecting the logs of TCU 312, IVI 313, and the like, ADAS ECU 317 collects the logs through a communication channel of GW 315 that can be used. Additionally, ADAS ECU 317 performs detection and the like of an improper operation of TCU 312 and IVI 313 through GW 315.

On the other hand, when the depth of penetration is the same as ADAS ECU 317 or is deeper than ADAS ECU 317, ADAS ECU 317 may not operate correctly due to the attack, and thus no control is defined in this example.

FIG. 10 is a table showing an example of control when V2X ECU 318 performs control in the first penetration example, in vehicle system 100 illustrated in FIG. 5. FIG. 10 illustrates control performed by V2X ECU 318, instead of monitoring ECU 316 or monitoring block 314, at each depth of penetration in the first penetration example. In this example, V2X ECU 318 changes control pertaining to notifications, defense, and storage according to the depth of penetration.

The control performed by V2X ECU 318 is the same as the control performed by monitoring ECU 316 and the like, and is therefore the same control as that illustrated in FIG. 7. Accordingly, "monitoring ECU 316" can be replaced with "V2X ECU 318" in the descriptions referring to FIG. 7.

However, when collecting the logs of TCU 312, IVI 313, control-related ECU 320, and the like, V2X ECU 318 collects the logs through a communication channel of GW 315 that can be used. Additionally, V2X ECU 318 performs detection and the like of an improper operation of TCU 312 and IVI 313 through GW 315.

FIG. 11 is a table showing an example of control when IVI 313 performs control in the first penetration example, in vehicle system 100 illustrated in FIG. 5. FIG. 11 illustrates control performed by IVI 313, instead of monitoring ECU 316 or monitoring block 314, at each depth of penetration in the first penetration example. In this example, IVI 313 changes control pertaining to notifications, defense, and storage according to the depth of penetration.

Additionally, this example assumes that IVI 313 does not include monitoring block 314. This example also assumes that after TCU 312 has been attacked, GW 315 is attacked without IVI 313 being attacked.

When the depth of penetration corresponds to TCU 312, the control performed by IVI 313 is the same as the control performed by monitoring ECU 316 and the like, and is therefore the same control as that illustrated in FIG. 7. Accordingly, when the depth of penetration corresponds to TCU 312, "monitoring ECU 316" can be replaced with "IVI 313" in the descriptions referring to FIG. 7.

Additionally, when GW 315 has been attacked, if TCU 312 can be used, IVI 313 notifies server 301 of information on the attack through TCU 312. In this case, if TCU 312 cannot be used, IVI 313 notifies server 301 of information on the attack through IVI 313. In other words, if TCU 312 cannot be used, IVI 313 notifies server 301 of the information on the attack through the communication path that connects IVI 313 to server 301, without going through TCU 312.

The same communication path will be used for the notification even if the penetration has reached deeper than GW 315. IVI 313 may change the information of the notification according to the depth.

Additionally, when an attack on one communication channel of the two communication channels of GW 315 has succeeded, IVI 313 switches the operation mode of GW 315 to safe mode through the other communication channel. Additionally, by notifying ADAS ECU 317, control-related ECU 320, and the like of the attacked communication channel through the communication channel that can be used, IVI 313 performs control so that ADAS ECU 317, control-related ECU 320, and the like do not receive signals from the attacked communication channel.

Additionally, when GW 315 has been attacked, IVI 313 adds a log of GW 315 to the logs to be stored. Additionally, when ADAS ECU 317 or control-related ECU 320 has been attacked, IVI 313 adds a log of ADAS ECU 317 or control-related ECU 320 to the logs to be stored. These operations are the same as in the examples illustrated in FIGS. 7, 8, and the like. IVI 313 may collect the logs through GW 315 through the communication channel of GW 315 that can be used.

Figure 12:
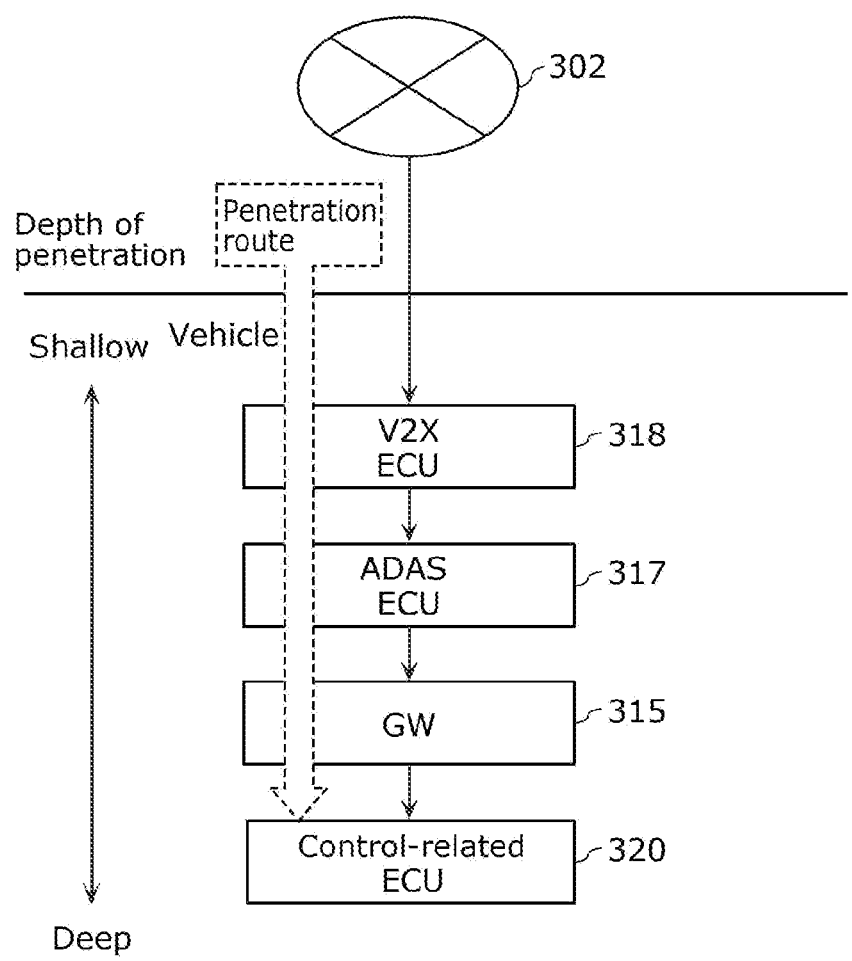
FIG. 12 is a conceptual diagram illustrating a second penetration example according to Embodiment 1.

FIG. 12 is a conceptual diagram illustrating a second penetration example in vehicle system 100 illustrated in FIG. 5. FIG. 12 illustrates the second penetration example, which is different from the first penetration example illustrated in FIG. 5. This example assumes that an attack is carried out on vehicle system 100 in the following order: V2X ECU 318, ADAS ECU 317, GW 315, and control-related ECU 320.

Note that there are cases where an attack on ADAS ECU 317 is skipped. For example, when V2X ECU 318 has been hijacked, it is possible that GW 315 will be attacked without ADAS ECU 317 being attacked. There are also cases where an attack on GW 315 is skipped. For example, when ADAS ECU 317 has been hijacked, it is possible that control-related ECU 320 will be attacked without GW 315 being attacked. Furthermore, there are cases where attacks on ADAS ECU 317 and GW 315 are skipped.

FIG. 13 is a table showing an example of control when monitoring ECU 316 or monitoring block 314 performs control in the second penetration example, in vehicle system 100 illustrated in FIG. 5. FIG. 13 illustrates control performed by monitoring ECU 316 or monitoring block 314 at each depth of penetration in the second penetration example. In this example, monitoring ECU 316 changes control pertaining to notifications, defense, and storage according to the depth of penetration.

For example, when V2X ECU 318 has been attacked, monitoring ECU 316 notifies server 301 of information on the attack through TCU 312, IVI 313, or E-call 311. If none of these can be used, monitoring ECU 316 notifies a user of information on the attack. The same communication path will be used for the notification even if the penetration has reached deeper than V2X ECU 318. Monitoring ECU 316 may change the information of the notification according to the depth.

Additionally, when V2X ECU 318 has been attacked, monitoring ECU 316 stops V2X ECU 318 and switches the system of communication with the exterior to a communication system that does not go through V2X ECU 318. In this case, by notifying ADAS ECU 317, control-related ECU 320, and the like of the information on the attack, monitoring ECU 316 controls ADAS ECU 317, control-related ECU 320, and the like so as not to receive signals from the attacked communication channel.

Additionally, when V2X ECU 318 has been attacked, monitoring ECU 316 overwrites an improper command with an error frame in the CAN. For example, when a command output from V2X ECU 318 has been detected, monitoring ECU 316 overwrites the command output from V2X ECU 318 with an error frame by outputting an error frame.

Additionally, when V2X ECU 318 has been attacked, monitoring ECU 316 collects a log of V2X ECU 318 and a log of the in-vehicle network to which V2X ECU 318 is connected. Monitoring ECU 316 then adds a signature to the logs and stores the logs in monitoring ECU 316. Specifically, monitoring ECU 316 stores the logs in memory provided in monitoring ECU 316. At this time, monitoring ECU 316 may add location information and a timestamp to the logs using GPS and a GPS time.

Additionally, when ADAS ECU 317 has been attacked, monitoring ECU 316 overwrites an improper command with an error frame in the CAN. For example, when a command output from ADAS ECU 317 has been detected, monitoring ECU 316 overwrites the command output from ADAS ECU 317 with an error frame by outputting an error frame. Additionally, when ADAS ECU 317 has been attacked, monitoring ECU 316 adds a log of ADAS ECU 317 to the logs to be stored.

Additionally, when an attack on one communication channel of the two communication channels of GW 315 has succeeded, monitoring ECU 316 switches the operation mode of GW 315 to safe mode through the other communication channel. When an attack on all the communication channels of GW 315 has succeeded, monitoring ECU 316 stops autonomous driving. Alternatively, in this case, monitoring ECU 316 transitions the autonomous driving to failsafe. Alternatively, in this case, monitoring ECU 316 may instruct vehicle 310 to stop traveling.

Additionally, when GW 315 has been attacked, monitoring ECU 316 overwrites an improper command with an error frame in the CAN. For example, when a command output from GW 315 has been detected, monitoring ECU 316 overwrites the command output from GW 315 with an error frame by outputting an error frame.

Additionally, when GW 315 has been attacked, monitoring ECU 316 adds a log of GW 315 to the logs to be stored. Monitoring ECU 316 may store the log of GW 315 for each of the communication channels.

Additionally, when control-related ECU 320 has been attacked, monitoring ECU 316 overwrites an improper command with an error frame in the CAN. For example, when a command output from control-related ECU 320 has been detected, monitoring ECU 316 overwrites the command output from control-related ECU 320 with an error frame by outputting an error frame.

Additionally, when control-related ECU 320 has been attacked, monitoring ECU 316 adds a log of control-related ECU 320 to the logs to be stored. In this case, monitoring ECU 316 may add a log of the one or more ECUs 319 and the one or more control-related ECUs 320 to the logs to be stored. Monitoring ECU 316 may store these logs for each ECU.

Additionally, when control-related ECU 320 has been attacked, monitoring ECU 316 may add a log of the in-vehicle network to which control-related ECU 320 is connected to the logs to be stored. In this case, monitoring ECU 316 may add a log of the plurality of buses to which the one or more ECUs 319 and the one or more control-related ECUs 320 are connected to the logs to be stored. Monitoring ECU 316 may store these logs for each bus.

The amount of information in a log increases with the depth of penetration. To increase the security, monitoring ECU 316 may store logs, or transmit logs, according to a deeper depth of penetration than a current depth of penetration. For example, when ADAS ECU 317 has been attacked, monitoring ECU 316 may include the log of GW 315 in the logs to be stored.

Additionally, although the foregoing describes operations of monitoring ECU 316, monitoring block 314 in IVI 313 may perform the same operations instead of monitoring ECU 316. In the configuration illustrated in FIG. 5, when GW 315 has been attacked, it may be difficult for monitoring block 314 to collect logs of control-related ECU 320 and the like through GW 315. However, if one of the two communication channels of GW 315 can be used, monitoring block 314 may collect the logs of control-related ECU 320 and the like through the communication channel that can be used.

Additionally, monitoring block 314 may store the logs in memory within monitoring block 314, or IVI 313 may store the logs in memory provided outside monitoring block 314. Additionally, if one of the two communication channels of GW 315 can be used, monitoring block 314 may, through the communication channel that can be used, instruct ECU 319 and the like to overwrite a command output by the attacked constituent element with an error frame.

FIG. 14 is a table showing an example of control when GW 315 performs control in the second penetration example, in vehicle system 100 illustrated in FIG. 5. FIG. 14 illustrates control performed by GW 315, instead of monitoring ECU 316 or monitoring block 314, at each depth of penetration in the second penetration example. In this example, GW 315 changes control pertaining to notifications, defense, and storage according to the depth of penetration.

When the depth of penetration corresponds to V2X ECU 318 or ADAS ECU 317, the control performed by GW 315 is the same as the control performed by monitoring ECU 316 and the like, and is therefore the same control as that illustrated in FIG. 13. Accordingly, when the depth of penetration corresponds to V2X ECU 318 or ADAS ECU 317, "monitoring ECU 316" can be replaced with "GW 315" in the descriptions referring to FIG. 13.

When an attack on one communication channel of the two communication channels of GW 315 has succeeded, GW 315 uses the other communication channel that can be used to notify server 301 through the same communication path as when the depth of penetration corresponds to V2X ECU 318 or ADAS ECU 317. The same communication path will be used for the notification even if the penetration has reached deeper than GW 315. GW 315 may change the information of the notification according to the depth.

Additionally, when an attack command has been detected, GW 315 may prohibit the transfer of that command. Additionally, when an attack on one communication channel of the two communication channels of GW 315 has succeeded, GW 315 stops the communication function of that communication channel and switches the operation mode to safe mode. When all the communication channels of GW 315 have been attacked, GW 315 stops autonomous driving. Alternatively, when all the communication channels of GW 315 have been attacked, GW 315 transitions the autonomous driving to failsafe. Alternatively, GW 315 may instruct vehicle 310 to stop traveling before all the communication channels of GW 315 are attacked.

Additionally, when GW 315 has been attacked, GW 315 adds a log of GW 315 to the logs to be stored. GW 315 may store the log of GW 315 for each of the communication channels.

Additionally, when control-related ECU 320 has been attacked, if one communication channel of GW 315 can be used, GW 315 adds a log of control-related ECU 320 to the logs to be stored.

In other words, when control-related ECU 320 has been attacked, GW 315 collects the log of control-related ECU 320 through the communication channel that can be used, and stores the collected log. Additionally, in this case, GW 315 may add a log of the one or more ECUs 319 and the one or more control-related ECUs 320 to the logs to be stored. GW 315 may store these logs for each ECU.

Additionally, when control-related ECU 320 has been attacked, if one of the communication channels of GW 315 can be used, GW 315 may add a log of the in-vehicle network to which control-related ECU 320 is connected to the logs to be stored.

In other words, when control-related ECU 320 has been attacked, GW 315 collects the log of the in-vehicle network to which control-related ECU 320 is connected through the communication channel that can be used, and stores the collected log. Additionally, in this case, GW 315 may add a log of the plurality of buses to which the one or more ECUs 319 and the one or more control-related ECUs 320 are connected to the logs to be stored. GW 315 may store a log for each of the buses.

The amount of information in a log increases with the depth of penetration. To increase the security, GW 315 may store logs, or transmit logs, according to a deeper depth of penetration than a current depth of penetration. When IVI 313 has been attacked, GW 315 may include the log of GW 315 in the logs to be stored.

The capacity of the memory provided in GW 315 is basically small. Accordingly, GW 315 may store some or all of the logs in the memory provided in ADAS ECU 317, and may store some or all of the logs in the memory provided in IVI 313. Additionally, when an attack on one communication channel of the two communication channels of GW 315 has succeeded, GW 315 may store the logs in the memory provided in ADAS ECU 317 or the memory provided in IVI 313 via the other communication channel that can be used.

Additionally, when ADAS ECU 317 is under attack, GW 315 may store the logs in the memory provided in IVI 313. Additionally, when IVI 313 is under attack, GW 315 may store the logs in the memory provided in ADAS ECU 317.

Figure 15:
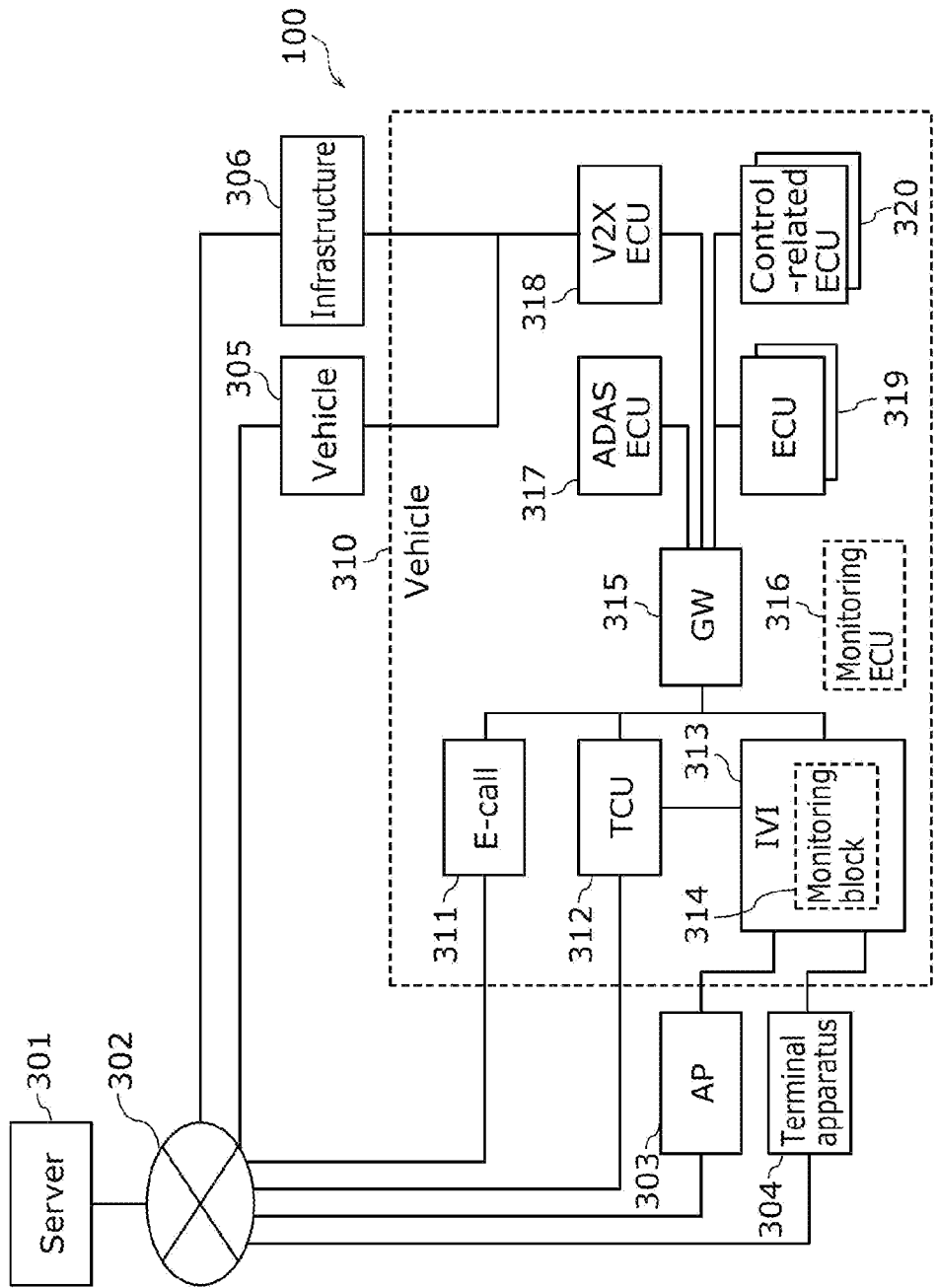
FIG. 15 is a block diagram illustrating a second specific example of the vehicle system according to Embodiment 1.

FIG. 15 is a block diagram illustrating a second specific example of vehicle system 100 illustrated in FIG. 1. Vehicle system 100 illustrated in FIG. 15 basically has the same configuration as vehicle system 100 illustrated in FIG. 5. However, in vehicle system 100 illustrated in FIG. 15, ADAS ECU 317 and V2X ECU 318 are connected via GW 315.

Figure 16:
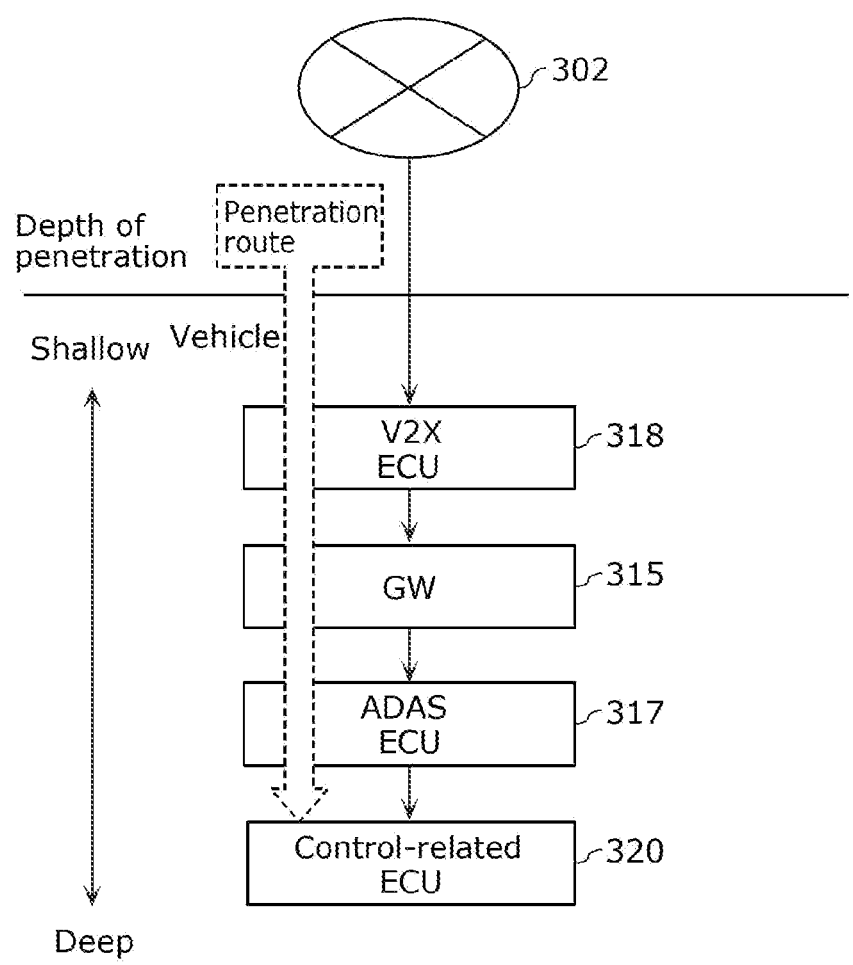
FIG. 16 is a conceptual diagram illustrating a third penetration example according to Embodiment 1.

FIG. 16 is a conceptual diagram illustrating a penetration example in vehicle system 100 illustrated in FIG. 15. This example assumes that an attack is carried out on vehicle system 100 in the following order: V2X ECU 318, GW 315, ADAS ECU 317, and control-related ECU 320.

Note that there are cases where an attack on GW 315 is skipped. For example, when V2X ECU 318 has been hijacked, it is possible that ADAS ECU 317 will be attacked without GW 315 being attacked. There are also cases where an attack on ADAS ECU 317 is skipped. For example, when GW 315 has been hijacked, it is possible that control-related ECU 320 will be attacked without ADAS ECU 317 being attacked. Furthermore, there are cases where attacks on GW 315 and ADAS ECU 317 are skipped.

FIG. 17 is a table showing an example of control when ADAS ECU 317 performs control in the penetration example, in vehicle system 100 illustrated in FIG. 15. FIG. 17 illustrates control performed by ADAS ECU 317, instead of monitoring ECU 316 or monitoring block 314, at each depth of penetration in the penetration example illustrated in FIG. 16. In this example, ADAS ECU 317 changes control pertaining to notifications, defense, and storage according to the depth of penetration.

For example, when V2X ECU 318 has been attacked, ADAS ECU 317 notifies server 301 of information on the attack through TCU 312, IVI 313, or E-call 311. If none of these can be used, ADAS ECU 317 notifies a user of information on the attack.

Additionally, when V2X ECU 318 has been attacked, ADAS ECU 317 stops V2X ECU 318 and switches the system of communication with the exterior to a communication system that does not go through V2X ECU 318. In this case, by notifying control-related ECU 320 and the like of the information on the attack, ADAS ECU 317 controls control-related ECU 320 and the like so as not to receive signals from the attacked communication channel.

Additionally, when V2X ECU 318 has been attacked, ADAS ECU 317 collects a log of V2X ECU 318 and a log of the in-vehicle network to which V2X ECU 318 is connected. ADAS ECU 317 then adds a signature to the logs and stores the logs in monitoring ECU 316.

Specifically, ADAS ECU 317 stores the logs in memory provided in ADAS ECU 317. At this time, ADAS ECU 317 may add location information and a timestamp to the logs using GPS and a GPS time.

Additionally, when an attack on one communication channel of the two communication channels of GW 315 has succeeded, ADAS ECU 317 switches the operation mode of GW 315 to safe mode through the other communication channel. When all the communication channels of GW 315 have been attacked, ADAS ECU 317 stops autonomous driving. Alternatively, when all the communication channels of GW 315 have been attacked, ADAS ECU 317 transitions the autonomous driving to failsafe. Alternatively, ADAS ECU 317 may instruct vehicle 310 to stop traveling before all the communication channels of GW 315 are attacked.

Additionally, when GW 315 has been attacked, ADAS ECU 317 overwrites an improper command with an error frame in the CAN. For example, when a command output from GW 315 has been detected, ADAS ECU 317 overwrites the command output from GW 315 with an error frame by outputting an error frame.

Additionally, when GW 315 has been attacked, ADAS ECU 317 adds a log of GW 315 to the logs to be stored. ADAS ECU 317 may store the log of GW 315 for each of the communication channels.

The configuration and operations of vehicle system 100 illustrated in FIG. 2 and in FIGS. 5 to 17 are examples, and the configuration and operations of vehicle system 100 are not limited to this example. The plurality of in-vehicle apparatuses 110 and controller 120 included in vehicle system 100 can have a variety of configurations.

For example, GW 315 may be integrated with another apparatus. Specifically, GW 315 may be integrated with TCU 312. Alternatively, GW 315 may be integrated with any one of ECUs 319, or may be integrated with any one of control-related ECUs 320. Alternatively, GW 315 may be integrated with ADAS ECU 317 or with V2X ECU 318.

Additionally, for example, vehicle system 100 may include a plurality of GWs 315. Specifically, vehicle system 100 may include GW 315 used for the CAN, and GW 315 used for Ethernet (registered trademark). Then, in the same manner as when changing the defense method based on whether one or both of the two communication channels are attacked, the defense method may be changed based on whether one or both of the two GWs 315 are attacked.

Additionally, for example, monitoring ECU 316 or the like may store the logs in a dedicated storage apparatus, or may store the logs in a different apparatus, instead of storing the logs in monitoring ECU 316 or the like itself. Additionally, monitoring ECU 316 or the like may change the apparatus serving as the storage location of the logs according to the depth of penetration. Then, monitoring ECU 316 or the like may change the apparatus serving as the storage location, and change the apparatus for which the log is to be obtained, according to the depth of penetration.

In the example illustrated in FIG. 5, it is possible that control-related ECU 320 that controls driving of vehicle 310 will be attacked through TCU 312, IVI 313, GW 315, ADAS ECU 317, and the like. On the other hand, there are cases where it is difficult to identify an attack from the log of one apparatus among TCU 312, IVI 313, GW 315, ADAS ECU 317, and control-related ECU 320. Additionally, it is difficult to identify an overall image of the attack from the log of a single apparatus.

Specifically, even if the log of ADAS ECU 317 contains an anomalous command, the anomalous command may have been caused by a malfunction or an unexpected operation. On the other hand, when an anomaly occurs in TCU 312 as well, the anomalies are highly likely to be caused by a malicious attack.

Accordingly, for example, in vehicle system 100 according to the present embodiment, when an attack (or an anomaly or the like assumed to be an attack) has been detected in one apparatus, the logs of one or more apparatuses that are passed through before the attack reaches the stated one apparatus are stored or notifications are made thereof. Additionally, vehicle system 100 stores or makes notifications of the logs without using the attacked apparatus and function. As a result, the logs are stored or notified appropriately, and the attack, as well as an overall image thereof, can be identified.

Embodiment 2

The present embodiment will describe a specific configuration and processing for determining whether or not a malicious attack is being carried out. The basic configuration and processing of the present embodiment are the same as the configuration and processing in Embodiment 1, described with reference to FIGS. 1 to 17. The following will mainly describe parts that are different from Embodiment 1.

Figure 18:
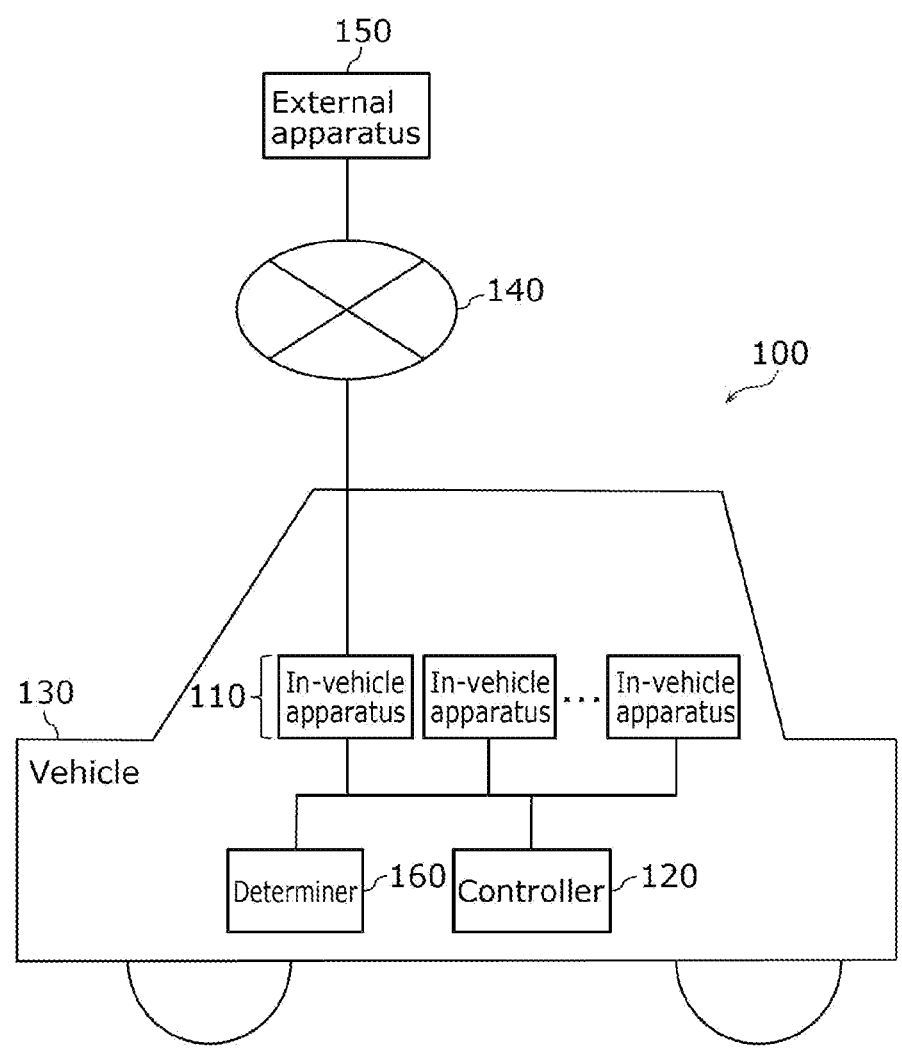
FIG. 18 is a block diagram illustrating the configuration of a vehicle system and the like according to Embodiment 2.

FIG. 18 is a block diagram illustrating the configuration of vehicle system 100 and the like according to the present embodiment. Compared to Embodiment 1, vehicle system 100 further includes determiner 160.

Determiner 160 is an information processor that determines whether or not a malicious attack is being carried out. Specifically, determiner 160 obtains information indicating an anomaly in the plurality of in-vehicle apparatuses 110. Then, determiner 160 determines whether or not the malicious attack is being carried out, in accordance with an anomaly occurrence order in the plurality of in-vehicle apparatuses 110.

For example, determiner 160 may determine that the malicious attack is being carried out when the anomaly occurrence order matches a predetermined order. The predetermined order may be an order in which at least two in-vehicle apparatuses 110 of the plurality of in-vehicle apparatuses 110 are arranged from shallower to deeper in a predetermined penetration route.

Determiner 160 may be included in controller 120. Additionally, determiner 160 may be included in any one of the plurality of in-vehicle apparatuses 110. Additionally, like controller 120, determiner 160 may be directly or indirectly connected to each of the plurality of in-vehicle apparatuses 110.

As illustrated in FIG. 2, vehicle system 100 according to the present embodiment may include anomaly detector 201, storage controller 202, at least one storage 203, information collector 204, damage detector 205, transmission controller 206, and at least one transmitter 207. These constituent elements can be included in the plurality of in-vehicle apparatuses 110, controller 120, or determiner 160 illustrated in FIG. 18.

Figure 19:
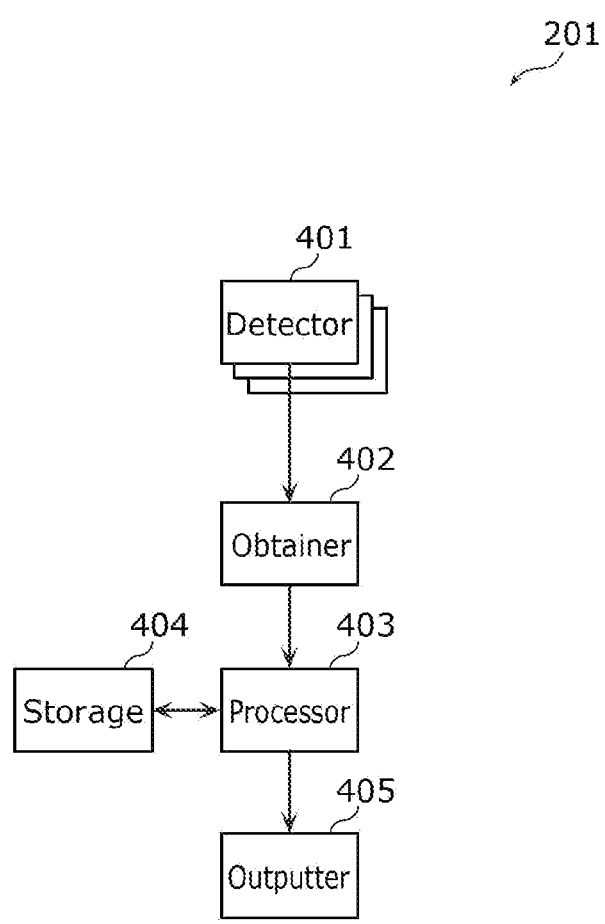
FIG. 19 is a schematic diagram illustrating function blocks of an anomaly detector according to Embodiment 2.

FIG. 19 is a schematic diagram illustrating function blocks of anomaly detector 201 illustrated in FIG. 2. For example, anomaly detector 201 includes at least one detector 401, obtainer 402, processor 403, storage 404, and outputter 405. For example, obtainer 402, processor 403, storage 404 and outputter 405 may be included in determiner 160. The at least one detector 401 may be included in the plurality of in-vehicle apparatuses 110.

Detector 401 is an information processor that detects an anomaly in in-vehicle apparatus 110 or the in-vehicle network. For example, detector 401 is included in in-vehicle apparatus 110, and detects an anomaly in that in-vehicle apparatus 110 by monitoring that in-vehicle apparatus 110. Additionally, detector 401 may detect an anomaly in in-vehicle apparatus 110 by monitoring that in-vehicle apparatus 110 over a network. Detector 401 may monitor the in-vehicle network and detect an anomaly in the in-vehicle network.

Additionally, for example, detector 401 may detect an anomaly in in-vehicle apparatus 110 or the in-vehicle network in accordance with a log or the like of in-vehicle apparatus 110 or the in-vehicle network.

Obtainer 402 is an information processor that obtains information. Specifically, obtainer 402 obtains an anomaly detection result from detector 401. For example, obtainer 402 obtains the anomaly detection result from detector 401 by detector 401 transmitting the anomaly detection result and obtainer 402 receiving the anomaly detection result. Additionally, obtainer 402 obtains a plurality of anomaly detection results from the at least one detector 401 sequentially by obtaining the anomaly detection result each time each of the at least one detector 401 detects an anomaly.

Additionally, for example, obtainer 402 may obtain, as the anomaly detection result, information indicating an anomaly in in-vehicle apparatus 110 or the in-vehicle network in accordance with a log or the like of in-vehicle apparatus 110 or the in-vehicle network.

Processor 403 is an information processor that processes information. Specifically, processor 403 determines whether or not a malicious attack is being carried out, in accordance with the plurality of anomaly detection results. At this time, processor 403 determines whether or not the malicious attack is being carried out, in accordance with an anomaly occurrence order in the plurality of in-vehicle apparatuses 110. Additionally, when it is determined that a malicious attack is being carried out, processor 403 may specify the penetration route of the malicious attack and the depth of penetration of the malicious attack. Note that the penetration route can also be described as an "attack route".

Storage 404 is information storage that stores information. Storage 404 may be memory or the like. Information for processor 403 to process information, i.e., information for determining whether or not a malicious attack is being carried out, is stored in storage 404. Specifically, a plurality of anomaly detection results, predetermined attack information, or a result of determining a malicious attack may be stored in storage 404.

Additionally, processor 403 may perform storage processing for storing information in storage 404, or another constituent element such as obtainer 402 may perform storage processing for storing information in storage 404. Additionally, processor 403 may perform reference processing for referring to the information stored in storage 404, or another constituent element such as outputter 405 may perform reference processing for referring to the information stored in storage 404.

Outputter 405 is an information processor that outputs information. Specifically, outputter 405 outputs a determination result from processor 403. In other words, outputter 405 outputs information including a determination result as to whether or not a malicious attack is being carried out. Specifically, outputter 405 may output a determination result as to whether or not a malicious attack is being carried out, the penetration route of the malicious attack, the depth of penetration of the malicious attack, the anomaly detection result, and the like.

For example, the information output from outputter 405 is output from anomaly detector 201, and is input to storage controller 202 and transmission controller 206 illustrated in FIG. 2. Storage controller 202 and transmission controller 206 control storage and transmission according to the input information.

Note that outputter 405 may output the anomaly detection result when it is determined that a malicious attack is being carried out, and not output the anomaly detection result when it is determined that a malicious attack is not being carried out. In this case, outputter 405 need not output the determination result as to whether or not a malicious attack is being carried out. Additionally, when it is determined that a malicious attack is being carried out, outputter 405 may output only an anomaly detection result indicating an anomaly occurring at the deepest location.

The configuration illustrated in FIG. 19 is one example, and the configuration of anomaly detector 201 is not limited to the example illustrated in FIG. 19. Additionally, although Embodiment 1 describes "damage" as being separate from an anomaly, damage may be treated as a type of anomaly and handled in the same manner as an anomaly.

Figure 20:
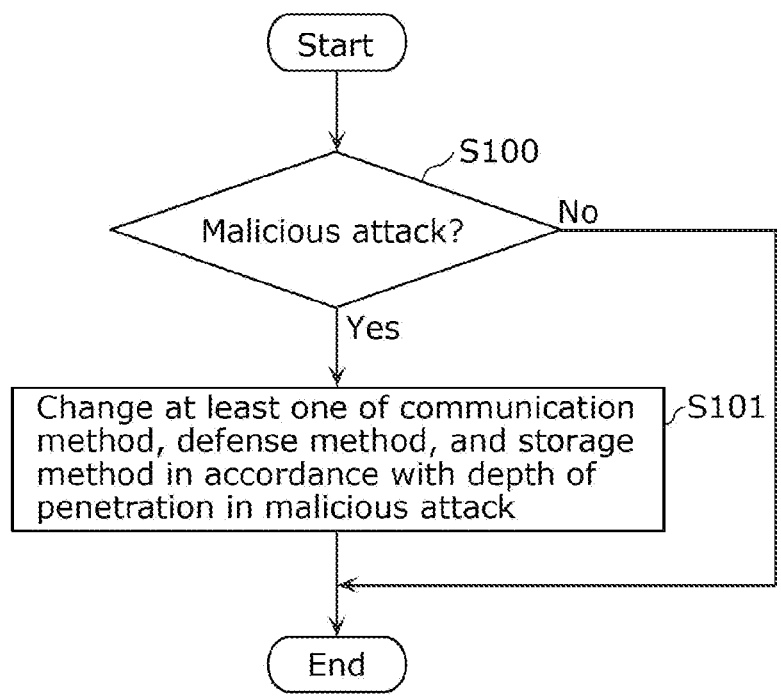
FIG. 20 is a flowchart illustrating operations of the vehicle system according to Embodiment 2.

FIG. 20 is a flowchart illustrating basic operations performed by vehicle system 100 illustrated in FIG. 18.

Determiner 160 determines whether or not a malicious attack is being carried out, in accordance with the anomaly occurrence order in the plurality of in-vehicle apparatuses 110 (S100).

Then, when determiner 160 has determined that a malicious attack is being carried out (Yes in S100), controller 120 changes at least one of the communication method, the defense method, or the storage method according to the depth of penetration of the malicious attack, as described in Embodiment 1 (S101). Note that when determiner 160 has determined that a malicious attack is not being carried out (No in S100), controller 120 continues using the default communication method, the default defense method, and the default storage method.

Figure 21:
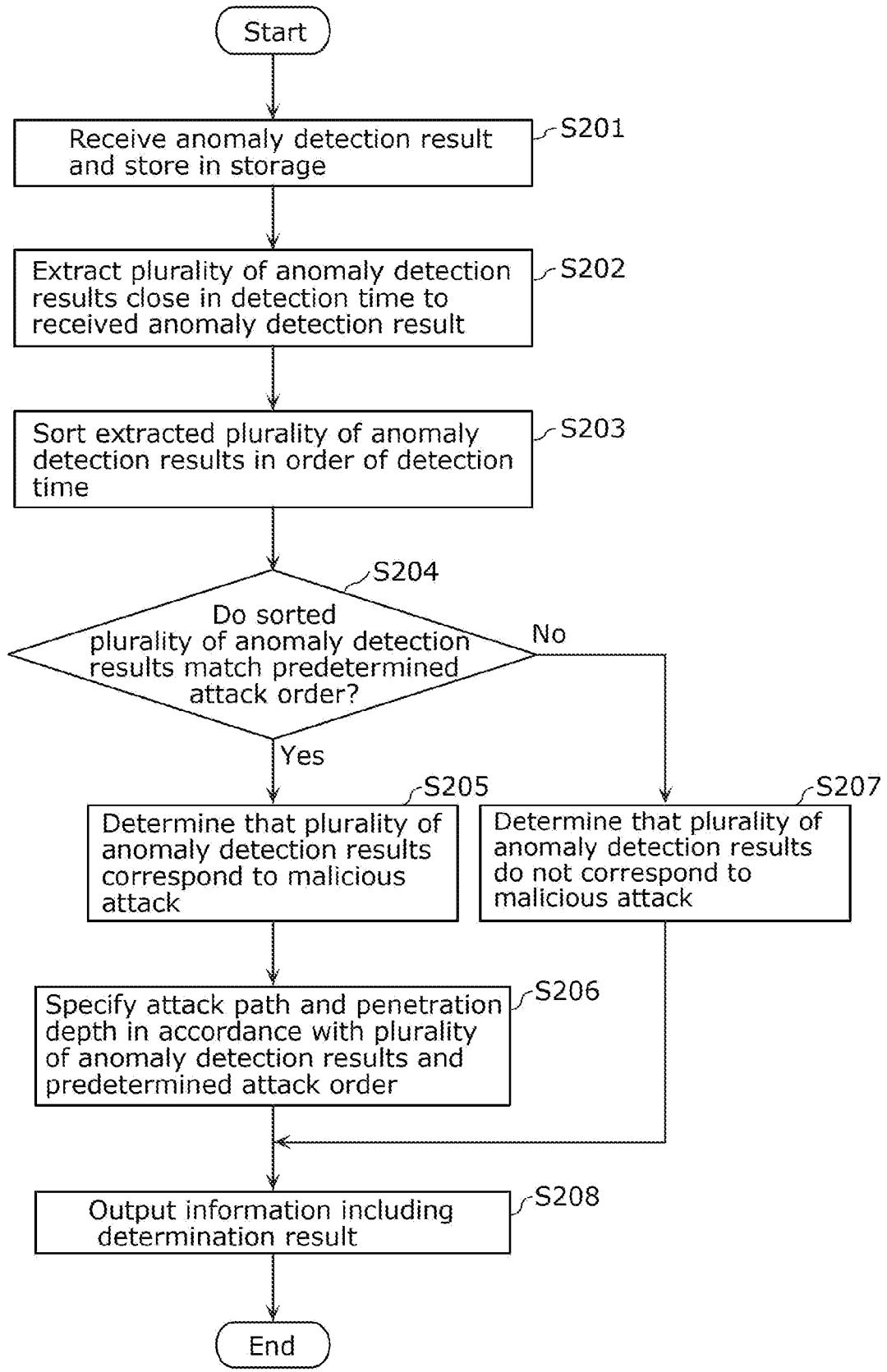
FIG. 21 is a flowchart illustrating processing for determining a malicious attack according to Embodiment 2.

FIG. 21 is a flowchart illustrating the processing for determining a malicious attack (S100) indicated in FIG. 20. For example, determiner 160 includes obtainer 402, processor 403, storage 404, and outputter 405 illustrated in FIG. 19, and these constituent elements perform the determination processing illustrated in FIG. 21.

First, obtainer 402 receives the anomaly detection result from detector 401, and stores the received anomaly detection result in storage 404 (S201). Then, processor 403 extracts, from storage 404, a plurality of anomaly detection results that are close, in terms of detection time, to the received anomaly detection result (S202). Then, processor 403 sorts the extracted plurality of anomaly detection results in order of detection time (S203).

Then, processor 403 determines whether or not the sorted plurality of anomaly detection results match a predetermined attack order (S204). Information indicating the predetermined attack order may be stored in storage 404 in advance. Additionally, processor 403 may determine whether or not the sorted plurality of anomaly detection results match a one of a plurality of predetermined attack orders.

When the sorted plurality of anomaly detection results match the predetermined attack order (Yes in S204), processor 403 determines that the anomaly detection results correspond to a malicious attack (S205). In other words, processor 403 determines that a malicious attack is being carried out. Then, processor 403 specifies the penetration route and the depth of penetration according to the plurality of anomaly detection results and the predetermined attack order (S206).

When the sorted plurality of anomaly detection results do not match the predetermined attack order (No in S204), processor 403 determines that the anomaly detection results do not correspond to a malicious attack (S207). In other words, processor 403 determines that a malicious attack is not being carried out.

Then, outputter 405 outputs information including a determination result as to whether or not there is a malicious attack (S208). For example, when it is determined that a malicious attack is being carried out, outputter 405 outputs information indicating that the malicious attack is being carried out, the penetration route, and the depth of penetration. When it is determined that a malicious attack is not being carried out, outputter 405 outputs information indicating that a malicious attack is not being carried out.

Figure 22:
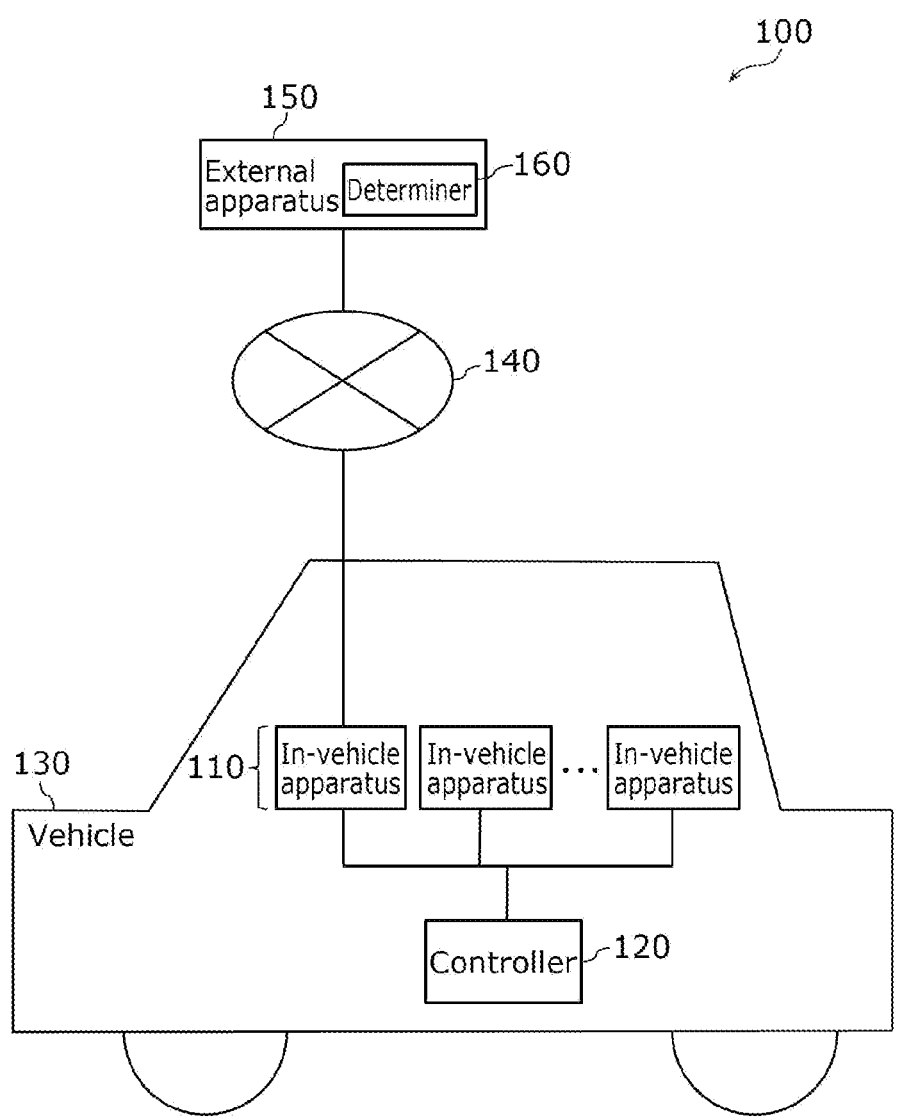
FIG. 22 is a block diagram illustrating a variation on the configuration of the vehicle system and the like according to Embodiment 2.

FIG. 22 is a block diagram illustrating a variation on the configuration of vehicle system 100 and the like illustrated in FIG. 18. In the present variation, determiner 160 is included in external apparatus 150.

For example, controller 120 transmits logs pertaining to the plurality of in-vehicle apparatuses 110 to external apparatus 150 via in-vehicle apparatus 110. When an anomaly has occurred in in-vehicle apparatus 110, controller 120 tentatively determines that the anomaly has occurred due to a malicious attack in in-vehicle apparatus 110. Then, according to the depth of penetration of the tentatively-determined malicious attack, controller 120 changes the communication method with the exterior, the defense method with respect to malicious attacks, and the storage method for logs. Controller 120 then transmits the logs to external apparatus 150 according to the changed communication method.

Then, for example, external apparatus 150 receives, from vehicle 130, the logs pertaining to the plurality of in-vehicle apparatuses 110. Specifically, determiner 160 obtains information indicating an anomaly in the plurality of in-vehicle apparatuses 110, according to the logs pertaining to the plurality of in-vehicle apparatuses 110. Then, a final determination as to whether or not a malicious attack is being carried out is made in accordance with the anomaly occurrence order in the plurality of in-vehicle apparatuses 110. External apparatus 150 then transmits information including the determination result to vehicle 130.

Additionally, controller 120 receives the information including the determination result from external apparatus 150 via in-vehicle apparatus 110, and changes or maintains the communication method with the exterior, the defense method with respect to malicious attacks, and the storage method for logs, according to the information including the determination result.

In other words, in the example illustrated in FIG. 18, after it is determined whether or not a malicious attack is being carried out according to the anomaly detection result, the notification method, defense method, storage method, or the like is controlled in vehicle 130. On the other hand, in the example illustrated in FIG. 22, after the notification method, defense method, storage method, or the like in vehicle 130 is controlled according to the anomaly detection result, it is determined whether or not a malicious attack is being carried out, and the determination result is fed back into the control.

Figure 23:
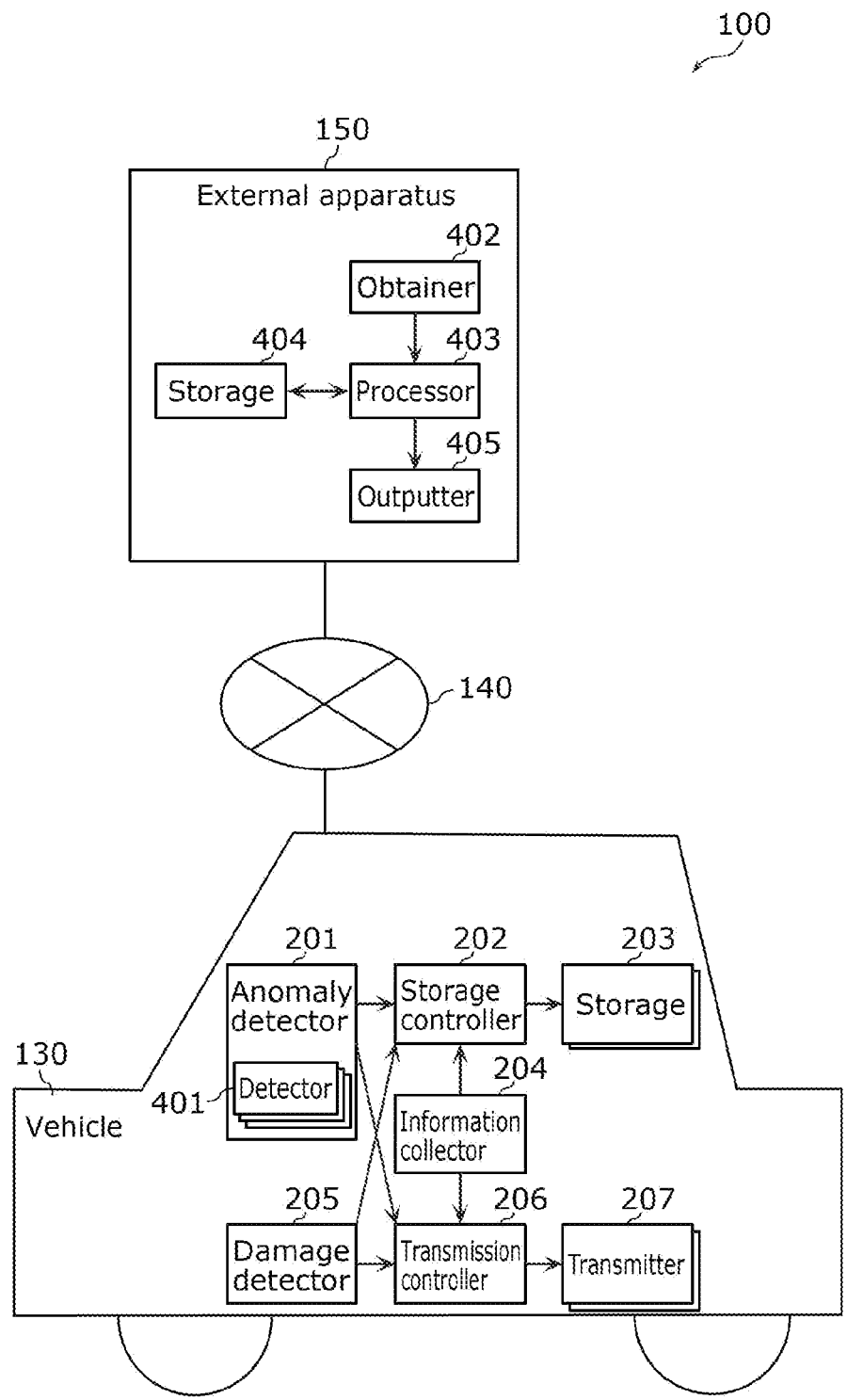
FIG. 23 is a schematic diagram illustrating a variation on function blocks of the vehicle system according to Embodiment 2.

FIG. 23 is a schematic diagram illustrating function blocks of vehicle system 100 illustrated in FIG. 22. For example, of the plurality of constituent elements of anomaly detector 201 illustrated in FIG. 19, obtainer 402, processor 403, storage 404, and outputter 405 are provided in external apparatus 150.

For example, in vehicle 130, anomaly detector 201, which includes the at least one detector 401, detects an anomaly. Storage controller 202 and transmission controller 206 change the storage method and the communication method according to the depth of penetration of a malicious attack, which is tentatively estimated based on the anomaly. Storage controller 202 then stores a log, including the anomaly detection result, in storage 203. Transmission controller 206 then transmits the log to external apparatus 150 via transmitter 207.

Additionally, for example, in external apparatus 150, obtainer 402 obtains the anomaly detection result by obtaining the log, including the anomaly detection result, from vehicle 130, and stores the obtained anomaly detection result in storage 404. Processor 403 obtains, from storage 404, a plurality of anomaly detection results that are close, in terms of detection time, to the obtained anomaly detection result, and determines whether or not a malicious attack is being carried out according to the obtained plurality of anomaly detection results. Outputter 405 outputs information including the determination result. Outputter 405 then transmits information including the determination result to vehicle 130.

Then, in vehicle 130, storage controller 202 and transmission controller 206 receive the information, including the determination result, from external apparatus 150 via information collector 204 and the like, and change or maintain the control according to the information including the determination result.

Figure 24:
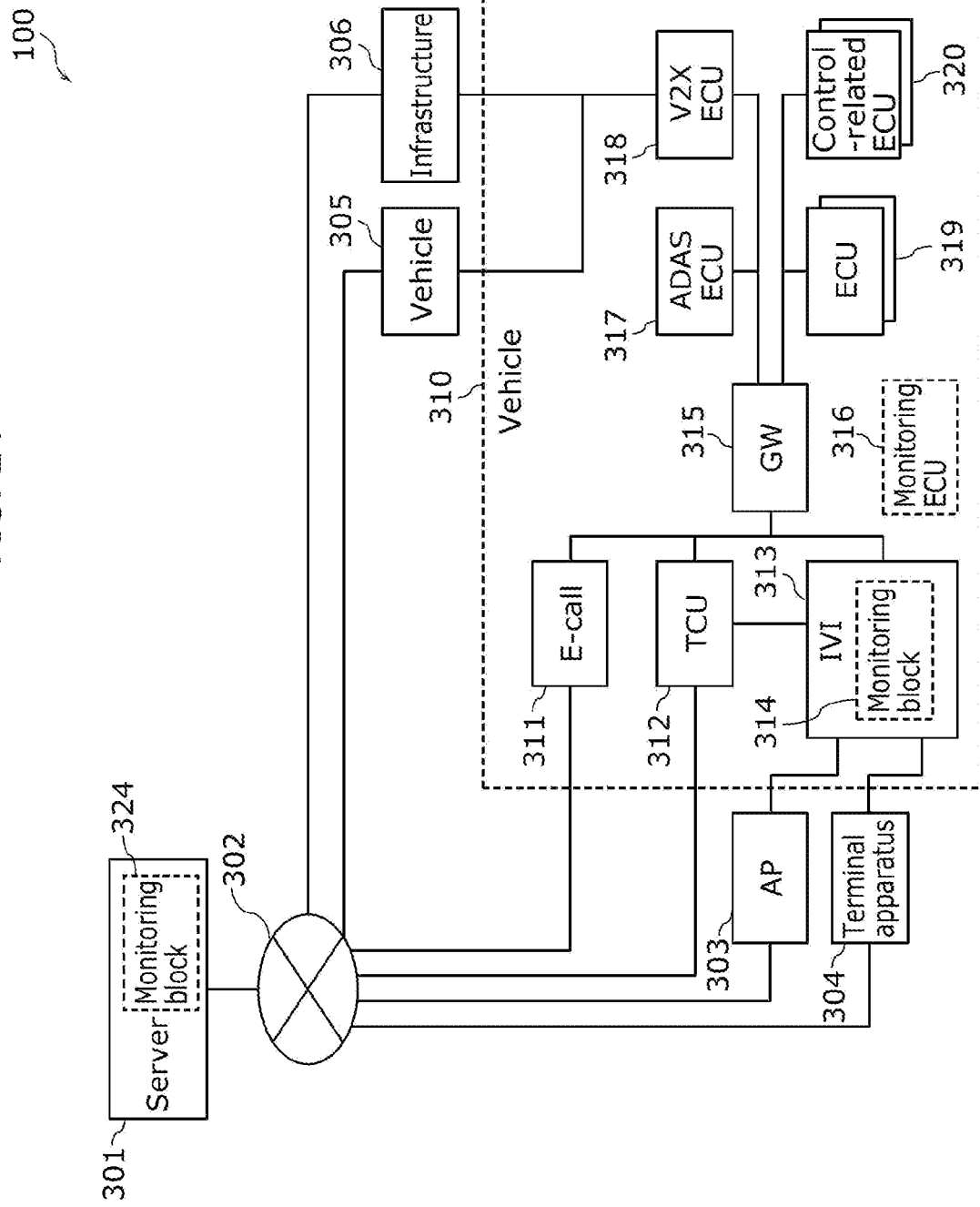
FIG. 24 is a block diagram illustrating a specific example of the vehicle system according to Embodiment 2.

FIG. 24 is a block diagram illustrating a specific example of vehicle system 100 illustrated in FIGS. 18 and 22. Vehicle system 100 illustrated in FIG. 24 basically has the same configuration as vehicle system 100 illustrated in FIG. 5.

However, monitoring block 314 or monitoring ECU 316 performs the role of controller 120, and also performs the role of determiner 160. Alternatively, monitoring block 324, which performs the role of determiner 160, may be included in server 301, separate from monitoring block 314 or monitoring ECU 316. In other words, vehicle system 100 includes monitoring block 314 or monitoring ECU 316, which performs the role of controller 120, and vehicle 310, and includes monitoring block 324, which performs the role of determiner 160, in server 301.

For example, as in Embodiment 1, monitoring ECU 316 monitors E-call 311, TCU 312, IVI 313, GW 315, ADAS ECU 317, V2X ECU 318, the one or more ECUs 319, the one or more control-related ECUs 320, and the like. Monitoring ECU 316 detects an anomaly in those constituent elements.

Monitoring ECU 316 determines whether or not a malicious attack is being carried out, in accordance with an anomaly occurrence order. Then, when a malicious attack is being carried out, monitoring ECU 316 changes the communication method, defense method, or storage method according to the depth of penetration of the malicious attack.

As in Embodiment 1, instead of monitoring ECU 316, vehicle system 100 may include monitoring block 314, which performs the same role as monitoring ECU 316.

Additionally, as described above, vehicle system 100 may include monitoring block 324, which performs the role of determiner 160, in server 301. In this case, monitoring ECU 316 in vehicle 310 detects an anomaly, and changes the communication method, defense method, or storage method according to the depth of penetration of a malicious attack, tentatively determined based on the detected anomaly. Monitoring ECU 316 then transmits a log, including the anomaly detection result, to server 301.

Then, monitoring block 324 in server 301 obtains the log including the anomaly detection result. Monitoring block 324 then determines whether or not a malicious attack is being carried out according to the plurality of anomaly detection results which have been stored. Monitoring block 324 then transmits information including the determination result to vehicle 310. Monitoring ECU 316 in vehicle 310 then changes or maintains the communication method, defense method, or storage method according to the information including the determination result.

Additionally, monitoring block 314, monitoring ECU 316, or monitoring block 324 may notify the user of information including the determination result as to whether or not a malicious attack is being carried out, via IVI 313, terminal apparatus 304, or the like. Additionally, monitoring block 314, monitoring ECU 316, or monitoring block 324 may notify an operator of information including the determination result as to whether or not a malicious attack is being carried out, via a user interface provided in server 301, Internet 302, or the like.

The information including the determination result as to whether or not a malicious attack as being carried out may, as described above, include a determination result as to whether or not a malicious attack is being carried out, the penetration route of the malicious attack, the depth of penetration of the malicious attack, the anomaly detection result, and the like. Additionally, the information including the determination result as to whether or not a malicious attack is being carried out may include an image indicating the penetration route, the penetration location, and so on. The user or the operator may then be notified of such information.

Additionally, for example, monitoring block 314, monitoring ECU 316, or monitoring block 324 illustrated in FIG. 24 may include obtainer 402, processor 403, storage 404, and outputter 405 illustrated in FIG. 19.

FIG. 25 is a table showing the plurality of anomaly detection results stored in storage 404, illustrated in FIG. 19. The plurality of anomaly detection results are stored in storage 404 in the order in which the anomalies are detected. Each anomaly detection result includes a detection time and an anomaly occurrence location. The detection time is a date/time at which the anomaly was detected. Here, the date/time at which the anomaly was detected is treated as the date/time at which the anomaly occurred. The anomaly occurrence location is the location where the anomaly occurred. The anomaly detection result may include other information.

In this example, an anomaly has been detected in IVI 313 on 2018 Aug. 1. Additionally, an anomaly has been detected in control-related ECU 320 on 2018 Aug. 3. An anomaly has also been detected in ADAS ECU 317. On 2018 Aug. 10, an anomaly has been detected in IVI 313, after which an anomaly has also been detected in GW 315. This information is stored in storage 404.

FIG. 26 is a table showing a new anomaly detection result stored in storage 404 illustrated in FIG. 19, as well as a plurality of anomaly detection results extracted from storage 404.

When a new anomaly has been detected, obtainer 402 obtains a new anomaly detection result, and stores the obtained new anomaly detection result in storage 404. In this example, the new anomaly detection result indicates that an anomaly has been detected in ADAS ECU 317 on 2018 Aug. 10.

Then, processor 403 extracts, from storage 404, a plurality of anomaly detection results that are close, in terms of detection time, to the new anomaly detection result. In this example, processor 403 extracts three anomaly detection results detected on the same day as the new anomaly detection result, including the new anomaly detection result itself. Processor 403 may extract anomaly detection results from within 24 hours from the detection time of the new anomaly detection result, from within one hour of the new anomaly detection result, or from another range.

Figure 27:
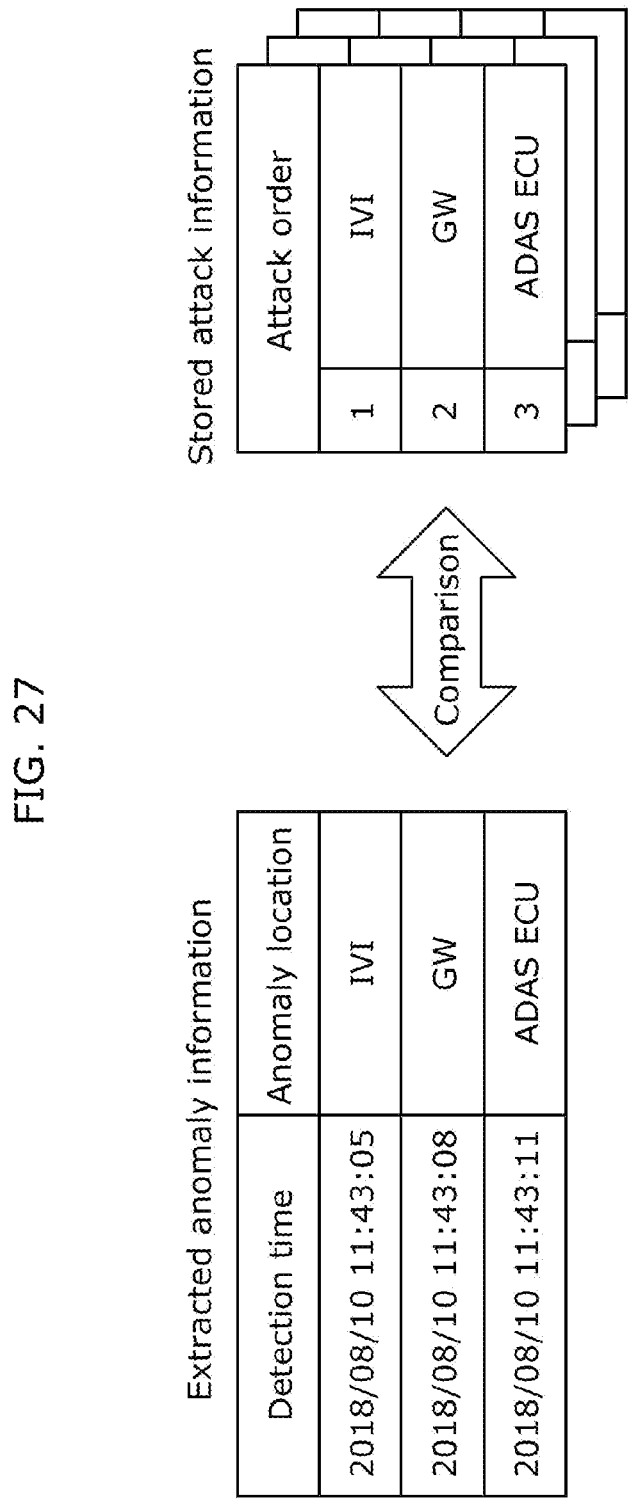
FIG. 27 is a schematic diagram illustrating processing for comparing anomaly information with attack information according to Embodiment 2.

FIG. 27 is a schematic diagram illustrating a process of comparison between the anomaly information extracted by processor 403 illustrated in FIG. 19 and the attack information pre-stored in storage 404 illustrated in FIG. 19. The anomaly information extracted by processor 403 illustrated in FIG. 19 corresponds to the plurality of anomaly detection results extracted by processor 403 in FIG. 26.

Processor 403 compares the extracted anomaly information with the stored attack information, and determines whether or not the extracted anomaly information and the stored attack information match. In other words, processor 403 determines whether or not the anomaly occurrence order, indicated by the extracted plurality of anomaly detection results, matches the predetermined attack order. When the extracted anomaly information and the stored attack information match, processor 403 determines that a malicious attack is being carried out. In other words, processor 403 determines that an anomaly is occurring due to a malicious attack.

Additionally, a plurality of predetermined attack orders may be stored in storage 404 in advance as the attack information. Processor 403 may determine whether or not the anomaly occurrence order matches any one of the plurality of predetermined attack orders. Processor 403 may determine that a malicious attack is being carried out when the anomaly occurrence order matches any one of the plurality of predetermined attack orders. At this time, processor 403 may determine that a malicious attack is being carried out in the predetermined attack order, among the plurality of predetermined attack orders, which the anomaly occurrence order matches.

Figure 28:
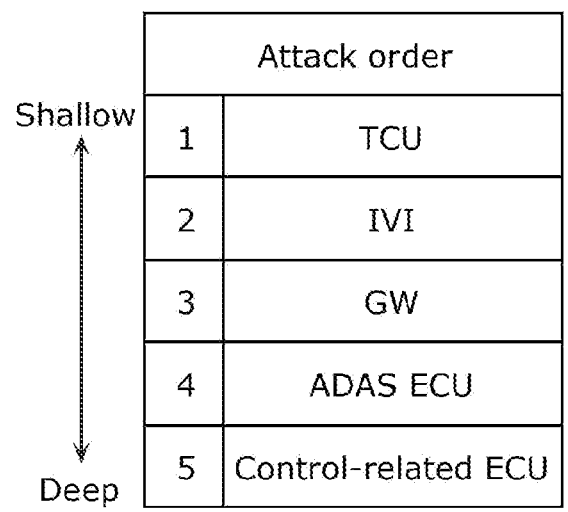
FIG. 28 is a schematic diagram illustrating a first example of a predetermined attack order according to Embodiment 2.

FIG. 28 is a schematic diagram illustrating a first example of the predetermined attack order stored in advance in storage 404 illustrated in FIG. 19. This attack order is based on a predetermined penetration route assumed as illustrated in FIG. 6. In other words, in this attack order, based on the predetermined penetration route assumed as illustrated in FIG. 6, TCU 312, IVI 313, GW 315, ADAS ECU 317, and control-related ECU 320 are arranged in order from shallow to deep (i.e., in order from the shallowest).

Figure 29:
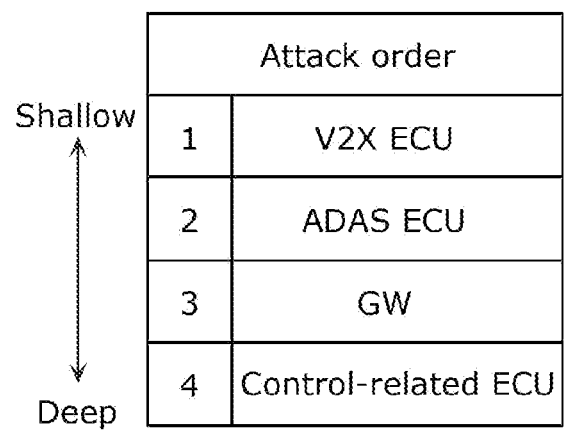
FIG. 29 is a schematic diagram illustrating a second example of a predetermined attack order according to Embodiment 2.

FIG. 29 is a schematic diagram illustrating a second example of the predetermined attack order stored in advance in storage 404 illustrated in FIG. 19. This attack order is based on a predetermined penetration route assumed as illustrated in FIG. 12. In other words, in this attack order, based on the predetermined penetration route assumed as illustrated in FIG. 12, V2X ECU 318, ADAS ECU 317, GW 315, and control-related ECU 320 are arranged in order from shallow to deep (i.e., in order from the shallowest).

When the anomaly occurrence order matches the attack order illustrated in FIG. 28 or FIG. 29, vehicle system 100 according to the present embodiment can determined that a malicious attack is being carried out according to the attack order which the anomaly occurrence order matches.

As described above, vehicle system 100 according to the present embodiment determines whether or not a malicious attack is being carried out, in accordance with the anomaly occurrence order in the plurality of in-vehicle apparatuses 110. Through this, vehicle system 100 can appropriately determine whether or not a malicious attack is being carried out.

For example, an anomaly is detected not only due to a malicious attack, but also due to a malfunction, a defect, a disturbance, an erroneous detection, and the like. Accordingly, it is not appropriate to consider all detected anomalies as being anomalies occurring due to a malicious attack and take measures against those anomalies. Accordingly, it is useful to determine whether or not a malicious attack is being carried out. However, it is not easy to determine whether or not a malicious attack is being carried out based on a single detected anomaly. Additionally, analyzing whether or not a malicious attack is being carried out may incur significant costs in terms of manpower, time, resources, and the like.

Vehicle system 100 according to the present embodiment can identify whether or not a malicious attack is being carried out in a simple manner, which makes it possible to reduce analysis costs. In addition, vehicle system 100 can reflect the determination result as to whether or not a malicious attack is taking place in measures taken against the attack.

Here, whether or not a malicious attack is being carried out is determined in accordance with the anomaly occurrence order in the plurality of in-vehicle apparatuses 110. Anomalies in the in-vehicle network may be included in the anomaly occurrence order rather than anomalies in in-vehicle apparatuses 110, however.

For example, vehicle 130 may include a plurality of in-vehicle networks. Additionally, the plurality of in-vehicle networks may include an in-vehicle network close to external network 140 and an in-vehicle network far from external network 140. It may be determined that a malicious attack is being carried out when an anomaly is detected in an in-vehicle network far from external network 140 after an anomaly is detected in an in-vehicle network close to external network 140.

Additionally, an anomaly in an in-vehicle network is assumed to be caused by in-vehicle apparatus 110, and is associated with in-vehicle apparatuses 110. Accordingly, an anomaly in an in-vehicle network may be handled as an anomaly in in-vehicle apparatus 110 with which the anomaly in the in-vehicle network is associated. Then, whether or not a malicious attack is being carried out may be determined in accordance with the anomaly occurrence order in the plurality of in-vehicle apparatuses 110.

Vehicle system 100 according to aspects of the present disclosure has been described thus far based on embodiments and the like, but the aspects of vehicle system 100 is not limited to the foregoing embodiments and the like. Embodiments that can be achieved by applying variations conceivable by those skilled in the art to the foregoing embodiments and the like, and other forms achieved by combining a plurality of constituent elements in the foregoing embodiments and the like as desired are also included in the scope of the aspects of vehicle system 100.

For example, processing executed by a specific constituent element may be executed by a different constituent element. The order in which processes are executed may be changed, and multiple processes may be executed in parallel.

Additionally, aside from vehicle system 100, an information processing method including steps (processes) performed by the constituent elements constituting vehicle system 100 may be realized.

The steps may be executed by a computer, for example. The computer may be a computer provided in vehicle system 100. In addition, a program for causing a computer to perform the steps included in the method may be realized. Furthermore, a non-transitory computer-readable recording medium, such as a CD-ROM, on which the program is recorded may be realized.

For example, when a program (software) is realized, each step is performed by executing the program using hardware resources such as a processor, memory, and the like of the computer. In other words, each step is executed by the processor obtaining data from the memory and the like and performing computations, outputting computation results to the memory and the like, and so on.

Each of the plurality of constituent elements included in vehicle system 100 and the like may be implemented as a dedicated or general-purpose circuit. The plurality of constituent elements may be implemented as a single circuit or as a plurality of circuits.

Additionally, the plurality of constituent elements included in vehicle system 100 and the like may be implemented through LSI (Large-Scale Integration), which is a format used for integrated circuits (ICs). These constituent elements can be implemented individually as single chips, or may be implemented with a single chip including some or all of the constituent elements. LSI may be referred to as "system LSI", "super LSI", or "ultra LSI" depending on the degree of integration.

The integrated circuit is not limited to LSI, and may be implemented as dedicated circuits or general-purpose processors. A programmable FPGA (Field Programmable Gate Array) or a reconfigurable processor where the connections and configurations of circuit cells within the LSI can be reconfigured may be used.

Furthermore, if other technologies that improve upon or are derived from semiconductor technology enable integration technology to replace LSI, then naturally it is also possible to use those technologies to create integrated circuits for the plurality of constituent elements included in vehicle system 100.

As described above, vehicle system 100 includes the plurality of in-vehicle apparatuses 110 and at least one of controller 120 or determiner 160. In accordance with the depth of penetration of a malicious attack carried out on the plurality of in-vehicle apparatuses 110, controller 120 changes at least one of a communication method with an outside of a vehicle, a defense method against the malicious attack, or a storage method for logs pertaining to the plurality of in-vehicle apparatuses 110. Determiner 160 determines whether or not a malicious attack is being carried out based on anomaly detection in the plurality of in-vehicle apparatuses 110.

In this manner, vehicle system 100 may be capable of changing the communication method, the defense method, the storage method, or the like in accordance with the circumstances of the attack. Alternatively, vehicle system 100 may be capable of appropriately determining whether or not a malicious attack is being carried out. Therefore, vehicle system 100 may be capable of performing adaptive control in response to an attack.

For example, controller 120 may change the communication method in accordance with the depth of penetration by changing in-vehicle apparatus 110 that is used to communicate with the outside of the vehicle among the plurality of in-vehicle apparatuses 110. Through this, vehicle system 100 may be capable of adaptively changing in-vehicle apparatus 110 used for communication according to circumstances of the attack. Therefore, vehicle system 100 may be capable of suppressing the effects of an attack.

Additionally, the plurality of in-vehicle apparatuses 110 may include a telematics communication unit. Then, when the depth of penetration reaches the telematics communication unit, controller 120 may change the communication method from a first communication method that is performed through the telematics communication unit to a second communication method that is not performed through the telematics communication unit. Through this, vehicle system 100 may be capable of performing communication appropriately without going through the attacked telematics communication unit.

Additionally, the plurality of in-vehicle apparatuses 110 may include in-vehicle infotainment. Then, when the depth of penetration reaches the telematics communication unit, controller 120 may change the communication method from a first communication method that is performed through the telematics communication unit to the second communication method that is performed through the in-vehicle infotainment. Through this, vehicle system 100 may be capable of performing communication appropriately through the in-vehicle infotainment, without going through the attacked telematics communication unit.

Additionally, for example, when the depth of penetration reaches the in-vehicle infotainment, controller 120 may change the communication method to a third communication method that is not performed through the in-vehicle infotainment. Through this, vehicle system 100 may be capable of performing communication appropriately without going through the attacked in-vehicle infotainment.

Additionally, for example, controller 120 may change the storage method in accordance with the depth of penetration by changing in-vehicle apparatus 110 that is used as a storage location of the log, among the plurality of in-vehicle apparatuses 110. Through this, vehicle system 100 may be capable of adaptively changing the storage location of logs according to circumstances of the attack. Therefore, vehicle system 100 may be capable of suppressing the effects of an attack.

Additionally, for example, when the depth of penetration reaches one or more in-vehicle apparatuses 110 included in the plurality of in-vehicle apparatuses 110, controller 120 may change the storage method by including a log of each of the one or more in-vehicle apparatuses 110 as a log to be stored. Through this, when one or more in-vehicle apparatuses 110 have been attacked, vehicle system 100 may be capable of including the logs of the attacked one or more in-vehicle apparatuses 110 as a log to be stored.

Additionally, the plurality of in-vehicle apparatuses 110 may include a telematics communication unit. Then, when the depth of penetration reaches the telematics communication unit, controller 120 may change the storage method by including a log of the telematics communication unit as the log to be stored. Through this, when the telematics communication unit has been attacked, vehicle system 100 may be capable of including the log of the attacked telematics communication unit as the log to be stored.

Additionally, the plurality of in-vehicle apparatuses 110 may include in-vehicle infotainment. Then, when the depth of penetration reaches the in-vehicle infotainment, controller 120 may change the storage method by including a log of the in-vehicle infotainment as the log to be stored. Through this, when the in-vehicle infotainment has been attacked, vehicle system 100 may be capable of including the log of the attacked in-vehicle infotainment as the log to be stored.

Additionally, for example, when the depth of penetration reaches first in-vehicle apparatus 110 included in the plurality of in-vehicle apparatuses 110, controller 120 may include a log of second in-vehicle apparatus 110 as the log to be stored. Here, second in-vehicle apparatus 110 is in-vehicle apparatus 110 included in the plurality of in-vehicle apparatuses 110, and is in-vehicle apparatus 110 for which the depth of penetration is estimated to reach first in-vehicle apparatuses 110 next. Then, controller 120 may change the storage method by including the log of second in-vehicle apparatus 110 as the log to be stored.

Through this, vehicle system 100 may be capable of including, as a log to be stored, a log of in-vehicle apparatus 110 which may be attacked next.

Additionally, for example, at least some of the plurality of in-vehicle apparatuses 110 may communicate over two communication channels. Then, when the depth of penetration reaches one of the two communication channels, controller 120 may cause the at least some of the plurality of in-vehicle apparatuses 110 to continue communicating over the other of the two communication channels. Additionally, when the depth of penetration reaches both of the two communication channels, controller 120 may change the defense method by stopping autonomous driving, stopping travel of the vehicle, or performing failsafe control. Through this, controller 120 may change the defense method.

Through this, vehicle system 100 may be capable of using different defense methods for when one of the two communication channels has been attacked, and when the two communication channels have been attacked. Vehicle system 100 may then be capable of changing the defense method appropriately according to the circumstances of the attack.

Additionally, the plurality of in-vehicle apparatuses 110 may include in-vehicle infotainment. The in-vehicle infotainment may include controller 120. Through this, vehicle system 100 may be capable of performing adaptive control in response to an attack, using the in-vehicle infotainment provided in the vehicle.

Additionally, the plurality of in-vehicle apparatuses 110 may include a gateway. The gateway may include controller 120. Additionally, controller 120 may store some or all of the logs in in-vehicle apparatus 110 that is not the gateway, among the plurality of in-vehicle apparatuses 110.

Through this, vehicle system 100 may be capable of performing adaptive control in response to an attack, using the gateway provided in the vehicle. Then, even when the gateway is low on memory, vehicle system 100 may be capable of storing the logs in another in-vehicle apparatus 110.

Additionally, for example, determiner 160 may determine whether or not the malicious attack is being carried out, in accordance with an order in which anomalies have occurred in the plurality of in-vehicle apparatuses 110. Through this, vehicle system 100 may be capable of appropriately determining whether or not a malicious attack is being carried out. Accordingly, vehicle system 100 may be capable of performing appropriate control according to whether or not a malicious attack is being carried out.

Additionally, for example, determiner 160 may determine that the malicious attack is being carried out when the anomaly detection matches a predetermined order. Here, the predetermined order is an order in which at least two in-vehicle apparatuses 110 of the plurality of in-vehicle apparatuses 110 are arranged from shallower to deeper in a predetermined penetration route. Through this, vehicle system 100 may be capable of appropriately determining that an anomaly occurring along the predetermined penetration route is a malicious attack.

Additionally, the above-described information processing method is an information processing method performed by vehicle system 100 used for a vehicle, which includes at least one of a control method or a determination method. In the control method, at least one of a communication method with an outside of a vehicle, a defense method against the malicious attack, or a storage method for logs pertaining to the plurality of in-vehicle apparatuses 110 is changed in accordance with the depth of penetration of a malicious attack carried out on the plurality of in-vehicle apparatuses 110 included in the vehicle. In the determination method, whether or not a malicious attack is being carried out is determined based on the anomaly detection in the plurality of in-vehicle apparatuses 110.

Through this, it may be possible to change the communication method, the defense method, the storage method, or the like in accordance with the circumstances of the attack. Alternatively, it may be possible to appropriately determine whether or not a malicious attack is being carried out. Therefore, it may be possible to perform adaptive control in response to an attack.

Additionally, the above-described recording medium is a non-transitory computer-readable recording medium having recorded thereon a program for causing a computer to execute the above-described information processing method.

Through this, the computer or the like that executes the program may be capable of changing the communication method, the defense method, the storage method, or the like in accordance with the circumstances of the attack. Alternatively, the computer or the like that executes the program may be capable of appropriately determining whether or not a malicious attack is being carried out. Therefore, the computer or the like that executes the program may be capable of performing adaptive control in response to an attack.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2018-202629 filed on Oct. 29, 2018 and Japanese Patent Application No. PCT/JP2019/022977 filed on Jun. 10, 2019.

INDUSTRIAL APPLICABILITY

The present disclosure can be used in vehicle systems and the like used in vehicles, and can be applied in security systems and the like for protecting vehicles from malicious attacks.

The invention claimed is:

1. A vehicle system used for a vehicle, the vehicle system comprising:
    a plurality of in-vehicle apparatuses installed in the vehicle;
    a memory that stores, in advance, a predetermined penetration route, the predetermined penetration route defining an attack order of a malicious attack which is to be carried out on at least three of the plurality of in-vehicle apparatuses, the attack order identifying the at least three of the plurality of in-vehicle apparatuses sequentially from closest to furthest from an external network;
    a controller that, in accordance with a depth of penetration of the malicious attack carried out on the at least three of the plurality of in-vehicle apparatuses, changes at least one of a communication method with an outside of the vehicle, a defense method against the malicious attack, or a storage method for logs pertaining to the plurality of in-vehicle apparatuses; and
    at least one of the controller or a processor that determines whether the malicious attack is being carried out based on anomaly detection in the plurality of in-vehicle apparatuses,
    wherein the at least one of the controller or the processor determines that the malicious attack is being carried out when the anomaly detection matches the predetermined penetration route.

2. The vehicle system according to claim 1,
    wherein the controller changes the communication method by changing an in-vehicle apparatus that is used to communicate with the outside of the vehicle, among the plurality of in-vehicle apparatuses, in accordance with the depth of penetration.

3. The vehicle system according to claim 2,
    wherein the plurality of in-vehicle apparatuses includes a telematics communication unit, and
    when the depth of penetration reaches the telematics communication unit, the controller changes the communication method from a first communication method that is performed through the telematics communication unit to a second communication method that is not performed through the telematics communication unit.

4. The vehicle system according to claim 3,
    wherein the plurality of in-vehicle apparatuses further includes in-vehicle infotainment, and
    when the depth of penetration reaches the telematics communication unit, the controller changes the communication method from the first communication method that is performed through the telematics communication unit to the second communication method that is performed through the in-vehicle infotainment.

5. The vehicle system according to claim 4,
    wherein when the depth of penetration reaches the in-vehicle infotainment, the controller changes the communication method to a third communication method that is not performed through the in-vehicle infotainment.

6. The vehicle system according to claim 1,
    wherein the controller changes the storage method by changing an in-vehicle apparatus that is used as a storage location of the logs, among the plurality of in-vehicle apparatuses, in accordance with the depth of penetration.

7. The vehicle system according to claim 6,
    wherein when the depth of penetration reaches one or more in-vehicle apparatuses included in the plurality of in-vehicle apparatuses, the controller changes the storage method by including a log of each of the one or more in-vehicle apparatuses as a log to be stored.

8. The vehicle system according to claim 6,
    wherein when the depth of penetration reaches a first in-vehicle apparatus included in the plurality of in-vehicle apparatuses, the controller changes the storage method by including a log of a second in-vehicle apparatus as a log to be stored, the second in-vehicle apparatus being included in the plurality of in-vehicle apparatuses and assumed to be an in-vehicle apparatus to be reached next by the depth of penetration after the first in-vehicle apparatus.

9. The vehicle system according to claim 7,
    wherein the plurality of in-vehicle apparatuses includes a telematics communication unit, and
    when the depth of penetration reaches the telematics communication unit, the controller changes the storage method by including a log of the telematics communication unit as the log to be stored.

10. The vehicle system according to claim 9,
    wherein the plurality of in-vehicle apparatuses includes in-vehicle infotainment, and
    when the depth of penetration reaches the in-vehicle infotainment, the controller changes the storage method by further including a log of the in-vehicle infotainment as the log to be stored.

11. The vehicle system according to claim 1,
    wherein at least some of the plurality of in-vehicle apparatuses communicate over two communication channels, and
    the controller changes the defense method by (i) causing the at least some of the plurality of in-vehicle apparatuses to continue communicating over a first of the two communication channels when the depth of penetration reaches a second of the two communication channels, and (ii) stopping autonomous driving, stopping travel of the vehicle, or performing failsafe control when the depth of penetration reaches both of the two communication channels.

12. The vehicle system according to claim 1,
    wherein the plurality of in-vehicle apparatuses includes in-vehicle infotainment, and
    the in-vehicle infotainment includes the controller.

13. The vehicle system according to claim 1,
    wherein the plurality of in-vehicle apparatuses includes a gateway,
    the gateway includes the controller, and
    the controller stores at least some of the logs in an in-vehicle apparatus that is not the gateway, among the plurality of in-vehicle apparatuses.

14. The vehicle system according to claim 1,
    wherein the depth of penetration is defined by at least one sequence of the at least three of the plurality of in-vehicle apparatuses from the external network to a drive control of the vehicle.

15. An information processing method performed by a vehicle system used for a vehicle, the vehicle including a plurality of in-vehicle apparatuses, the information processing method comprising:

storing, in a memory in advance, a predetermined penetration route, the predetermined penetration route defining an attack order of a malicious attack which is to be carried out on at least three of the plurality of in-vehicle apparatuses, the attack order identifying the at least three of the plurality of in-vehicle apparatuses sequentially from closest to furthest from an external network;

changing, in accordance with a depth of penetration of the malicious attack carried out on the at least three of the plurality of in-vehicle apparatuses included in the vehicle, at least one of a communication method with an outside of the vehicle, a defense method against the malicious attack, or a storage method for logs pertaining to the plurality of in-vehicle apparatuses; and determining, by at least one of a controller or a processor, whether the malicious attack is being carried out based on anomaly detection in the plurality of in-vehicle apparatuses, wherein the at least one of the controller or the processor determines that the malicious attack is being carried out when the anomaly detection matches the predetermined penetration route.

16. A non-transitory computer-readable recording medium having recorded thereon a program that causes a computer to execute an information processing method, the information processing method being performed by a vehicle system and being used for a vehicle, the vehicle including a plurality of in-vehicle apparatuses, the information processing method comprising:

storing, in a memory in advance, a predetermined penetration route, the predetermined penetration route defining an attack order of a malicious attack which is to be carried out on at least three of the plurality of in-vehicle apparatuses, the attack order identifying the at least three of the plurality of in-vehicle apparatuses sequentially from closest to furthest from an external network;

changing, in accordance with a depth of penetration of the malicious attack carried out on the at least three of the plurality of in-vehicle apparatuses included in the vehicle, at least one of a communication method with an outside of the vehicle, a defense method against the malicious attack, or a storage method for logs pertaining to the plurality of in-vehicle apparatuses; and determining, by the computer, whether the malicious attack is being carried out based on anomaly detection in the plurality of in-vehicle apparatuses, wherein the computer determines that the malicious attack is being carried out when the anomaly detection matches the predetermined penetration route.

* * * * *